United States Patent
Khoche

(10) Patent No.: US 12,061,946 B2
(45) Date of Patent: Aug. 13, 2024

(54) PACKAGE SEALING TAPE TYPES WITH VARIED TRANSDUCER SAMPLING DENSITIES

(71) Applicant: Trackonomy Systems, Inc., San Jose, CA (US)

(72) Inventor: Ajay Khoche, West San Jose, CA (US)

(*) Notice: Subject to any disclaimer, the term of this patent is extended or adjusted under 35 U.S.C. 154(b) by 0 days.

(21) Appl. No.: 17/890,206

(22) Filed: Aug. 17, 2022

(65) Prior Publication Data
US 2023/0113875 A1 Apr. 13, 2023

Related U.S. Application Data

(63) Continuation of application No. 17/102,338, filed on Nov. 23, 2020, now Pat. No. 11,551,052, which is a
(Continued)

(51) Int. Cl.
*G06K 19/077* (2006.01)
*B32B 37/06* (2006.01)
(Continued)

(52) U.S. Cl.
CPC ........ *G06K 19/07773* (2013.01); *B32B 37/06* (2013.01); *B32B 37/12* (2013.01);
(Continued)

(58) Field of Classification Search
CPC ....... G06K 19/07773; G06K 19/06037; G06K 19/0702; B32B 37/06; B32B 37/12;
(Continued)

(56) References Cited

U.S. PATENT DOCUMENTS

| 5,478,991 A | 12/1995 | Watanabe et al. |
| 5,495,250 A | 2/1996 | Ghaem et al. |

(Continued)

FOREIGN PATENT DOCUMENTS

| AU | 2018250358 | 5/2019 |
| CA | 3061878 | 11/2018 |

(Continued)

OTHER PUBLICATIONS

PCT International Search Report, International Application No. PCT/US 20/50739. International search completed Nov. 18, 2020. International Search Report mailed Dec. 18, 2020. pp. 1-2.
(Continued)

*Primary Examiner* — Seung H Lee

(57) ABSTRACT

A low-cost, multi-function adhesive tape platform with a form factor that unobtrusively integrates one or more transducers and one or more wireless communication devices in an adhesive product system. In an aspect, the adhesive product system integrates transducer and wireless communication components within a flexible adhesive structure in a way that not only provides a cost-effective platform for interconnecting, optimizing, and protecting the constituent components but also maintains the flexibility needed to function as an adhesive product that can be deployed seamlessly and unobtrusively into various applications and workflows, including sensing, notification, security, and object tracking applications, and asset management workflows such as manufacturing, storage, shipping, delivery, and other logistics associated with moving products and other physical objects.

20 Claims, 10 Drawing Sheets

Related U.S. Application Data continuation of application No. 16/430,929, filed on Jun. 4, 2019, now Pat. No. 10,885,420, which is a continuation-in-part of application No. 16/409,589, filed on May 10, 2019, now Pat. No. 10,902,310, and a continuation of application No. 16/383,353, filed on Apr. 12, 2019, now Pat. No. 10,872,286, and a continuation-in-part of application No. 15/842,867, filed on Dec. 14, 2017, now Pat. No. 10,445,634, said application No. 16/383,353 is a continuation of application No. 15/842,861, filed on Dec. 14, 2017, now Pat. No. 10,262,255.

(60) Provisional application No. 62/680,716, filed on Jun. 5, 2018, provisional application No. 62/670,712, filed on May 11, 2018, provisional application No. 62/435,207, filed on Dec. 16, 2016, provisional application No. 62/434,218, filed on Dec. 14, 2016.

(51) Int. Cl.
*B32B 37/12* (2006.01)
*C09J 7/38* (2018.01)
*G06K 19/06* (2006.01)
*G06K 19/07* (2006.01)
*H04W 4/029* (2018.01)
*H04W 4/02* (2018.01)

(52) U.S. Cl.
CPC .......... *C09J 7/38* (2018.01); *G06K 19/06037* (2013.01); *G06K 19/0702* (2013.01); *H04W 4/029* (2018.02); *B32B 2457/00* (2013.01); *C09J 2203/326* (2013.01); *C09J 2301/124* (2020.08); *C09J 2301/302* (2020.08); *C09J 2301/40* (2020.08); *C09J 2463/00* (2013.01); *H04W 4/027* (2013.01)

(58) Field of Classification Search
CPC ... B32B 2457/00; C09J 7/38; C09J 2203/326; C09J 2301/124; C09J 2301/302; C09J 2301/40; C09J 2463/00; C09J 7/20; H04W 4/029; H04W 4/027
See application file for complete search history.

(56) References Cited

U.S. PATENT DOCUMENTS

| | | | |
|---|---|---|---|
| 5,499,717 A | 3/1996 | Hayashi | |
| 5,838,253 A | 11/1998 | Wurz et al. | |
| 6,372,342 B1 | 4/2002 | Karaoglu | |
| 6,375,780 B1 | 4/2002 | Tuttle et al. | |
| 6,404,341 B1 | 6/2002 | Reid | |
| 6,614,392 B2 | 9/2003 | Howard | |
| 7,020,701 B1 | 3/2006 | Gelvin et al. | |
| 7,048,194 B2 | 5/2006 | Minami et al. | |
| 7,177,054 B2 | 2/2007 | Silverbrook et al. | |
| 7,259,030 B2 | 8/2007 | Daniels et al. | |
| 7,299,990 B2 | 11/2007 | Hoshina | |
| 7,321,167 B2 | 1/2008 | Zhong et al. | |
| 7,405,656 B2 | 7/2008 | Olsen | |
| 7,511,616 B2 | 3/2009 | Lake | |
| 7,540,603 B2 | 6/2009 | Otsuki | |
| 7,722,249 B2 | 5/2010 | Kim et al. | |
| 7,723,733 B2 | 5/2010 | Daniels et al. | |
| 7,838,844 B2 | 11/2010 | Wagner et al. | |
| 7,884,727 B2 | 2/2011 | Tran | |
| 8,062,735 B2 | 11/2011 | Bi et al. | |
| 8,072,620 B2 | 12/2011 | Yamamoto et al. | |
| 8,110,254 B1 | 2/2012 | Sharma et al. | |
| 8,114,248 B2 | 2/2012 | Lee et al. | |
| 8,269,633 B2 | 9/2012 | Hollander et al. | |
| 8,292,173 B2 | 10/2012 | Yturralde et al. | |
| 8,401,238 B2 | 3/2013 | Stahlin et al. | |
| 8,448,530 B2 | 5/2013 | Leuenberger et al. | |
| 8,658,455 B2 | 2/2014 | Shin et al. | |
| 8,716,629 B2 | 5/2014 | Klewer et al. | |
| 8,786,510 B2 | 7/2014 | Coleman et al. | |
| 8,833,664 B2 | 9/2014 | Choi | |
| 8,879,276 B2 | 11/2014 | Wang | |
| 8,971,673 B2 | 3/2015 | Beinhocker | |
| 9,070,286 B2 | 6/2015 | Moore | |
| 9,137,637 B2 | 9/2015 | Bilal et al. | |
| 9,159,635 B2 | 10/2015 | Elolampi et al. | |
| 9,182,231 B2 | 11/2015 | Skaaksrud | |
| 9,183,738 B1 | 11/2015 | Allen, Sr. et al. | |
| 9,250,104 B2 | 2/2016 | Greiner et al. | |
| 9,307,648 B2 | 4/2016 | Slafer | |
| 9,372,123 B2 | 6/2016 | Li et al. | |
| 9,419,502 B2 | 8/2016 | Veronesi et al. | |
| 9,471,862 B2* | 10/2016 | Atkinson | G06K 19/0723 |
| 9,473,902 B2 | 10/2016 | Bilal et al. | |
| 9,496,582 B1 | 11/2016 | Lim et al. | |
| 9,543,495 B2 | 1/2017 | Paschkewitz et al. | |
| 9,543,549 B2 | 1/2017 | Bai et al. | |
| 9,571,904 B2* | 2/2017 | Potyrailo | G06K 19/0702 |
| 9,583,428 B2 | 2/2017 | Rafferty et al. | |
| 9,632,050 B2 | 4/2017 | Zhong et al. | |
| 9,643,460 B2 | 5/2017 | Peine et al. | |
| 9,693,689 B2 | 7/2017 | Gannon et al. | |
| 9,753,568 B2 | 9/2017 | McMillen | |
| 9,781,825 B2 | 10/2017 | Farkas et al. | |
| 9,860,688 B2 | 1/2018 | Kulkarni et al. | |
| 9,886,015 B2 | 2/2018 | Wilson et al. | |
| 10,357,924 B2 | 7/2019 | Waldrop, III et al. | |
| 10,872,286 B2 | 12/2020 | Khoche | |
| 2003/0000128 A1 | 1/2003 | Wood et al. | |
| 2004/0044493 A1 | 3/2004 | Coulthard | |
| 2004/0131761 A1 | 7/2004 | Shakespeare | |
| 2005/0211998 A1 | 9/2005 | Daniels et al. | |
| 2006/0100299 A1 | 5/2006 | Malik et al. | |
| 2006/0248713 A1 | 11/2006 | Vatanparast et al. | |
| 2007/0049291 A1 | 3/2007 | Kim et al. | |
| 2007/0287473 A1 | 12/2007 | Dupray | |
| 2008/0198002 A1 | 8/2008 | Bartholf et al. | |
| 2009/0051530 A1 | 2/2009 | Brooks et al. | |
| 2009/0072974 A1 | 3/2009 | Miyashita et al. | |
| 2009/0174600 A1 | 7/2009 | Mazlum et al. | |
| 2009/0192709 A1 | 7/2009 | Yonker et al. | |
| 2009/0196267 A1 | 8/2009 | Walker, Sr. | |
| 2010/0096181 A1 | 4/2010 | Nakamura et al. | |
| 2010/0180701 A1 | 7/2010 | Daniel et al. | |
| 2010/0230498 A1 | 9/2010 | Atherton | |
| 2011/0202159 A1 | 8/2011 | Wang et al. | |
| 2011/0218756 A1 | 9/2011 | Callsen et al. | |
| 2011/0251469 A1 | 10/2011 | Varadan | |
| 2012/0234586 A1 | 9/2012 | Telle et al. | |
| 2012/0271540 A1 | 10/2012 | Miksa et al. | |
| 2013/0131980 A1 | 5/2013 | Ginsberg | |
| 2013/0250357 A1 | 9/2013 | Yu | |
| 2014/0014403 A1 | 1/2014 | Miller et al. | |
| 2014/0240088 A1 | 8/2014 | Robinette et al. | |
| 2014/0265915 A1 | 9/2014 | Huang et al. | |
| 2014/0268780 A1 | 9/2014 | Wang et al. | |
| 2014/0274139 A1 | 9/2014 | Bilal et al. | |
| 2014/0317406 A1 | 10/2014 | Lewis et al. | |
| 2014/0362890 A1 | 12/2014 | Qian | |
| 2015/0324745 A1 | 11/2015 | Goodall et al. | |
| 2015/0349667 A1 | 12/2015 | Andosca et al. | |
| 2015/0354973 A1 | 12/2015 | Wang et al. | |
| 2015/0382154 A1 | 12/2015 | Bilal et al. | |
| 2016/0011074 A1 | 1/2016 | Mian et al. | |
| 2016/0026213 A1 | 1/2016 | Li et al. | |
| 2016/0048709 A1 | 2/2016 | Butler et al. | |
| 2016/0147353 A1 | 5/2016 | Filiz et al. | |
| 2016/0205509 A1 | 7/2016 | Hoperaft et al. | |
| 2016/0270215 A1 | 9/2016 | Goto | |
| 2016/0322283 A1 | 11/2016 | McMahon et al. | |
| 2016/0370210 A1 | 12/2016 | Kapusta et al. | |
| 2016/0377440 A1 | 12/2016 | Dorum | |
| 2017/0017872 A1 | 1/2017 | Kato et al. | |
| 2017/0025547 A1 | 1/2017 | Cho et al. | |

(56) References Cited

U.S. PATENT DOCUMENTS

| | | |
|---|---|---|
| 2017/0079144 A1 | 3/2017 | Coleman et al. |
| 2017/0161679 A1 | 6/2017 | Stingel et al. |
| 2018/0003507 A1 | 1/2018 | Arslan et al. |
| 2018/0104609 A1 | 4/2018 | Musliner |
| 2018/0110450 A1 | 4/2018 | Lamego et al. |
| 2018/0167783 A1 | 6/2018 | Khoche |
| 2018/0326487 A1 | 11/2018 | Casper et al. |
| 2019/0113632 A1 | 4/2019 | Lucrecio et al. |
| 2019/0272458 A1 | 9/2019 | Khoche |
| 2019/0370624 A1 | 12/2019 | Khoche |
| 2020/0111343 A1 | 4/2020 | Krejcarek |

FOREIGN PATENT DOCUMENTS

| | | |
|---|---|---|
| EP | 1786143 | 5/2007 |
| JP | 2008239282 | 10/2008 |
| JP | 2009230500 | 10/2009 |
| WO | WO 2014195756 | 12/2014 |
| WO | WO 2016120628 | 8/2016 |
| WO | WO 2017046699 | 3/2017 |
| WO | WO 2017100707 | 6/2017 |

OTHER PUBLICATIONS

MVA Raju Bahubalendruni, HCL Technologies, Opticom, Optimization of Composite Laminate Stack-Up Sequence Using Differential Evolution Algorithm, Conference Paper, Oct. 2010, 35 pages.

Palavesam et al, Roll-to-Roll Processing of Film Substrates for Hybrid Integrated Flexible Electronics, 2018 IOP Jublishing Ltd., Flexible and Printed Electronics, 2018, 19 pages.

A Dementyev, H.-L. C. Kao, J. Paradiso, "SensorTape: Modular and Programmable 3D-Aware Dense Sensor Network on a Tape", In Proc. of UIST 2015.

Griffin et al., Adhesive RFID Sensor Patch for Monitoring of Sweat Electrolytes, in IEEE transactions on bio-medical engineering—Nov. 2014.

Pyo et al., "Development of a map matching method using the multiple hypothesis technique," 2001 IEEE Intelligent Transportation Systems Conference Proceedings—Oakland (CA), USA—Aug. 25-29, 2001.

Liu, Survey of Wireless Based Indoor Localization Technologies, arXiv:1709.01015v2 [cs.NI] Mar. 14, 2018.

K. W. Cheung et al., "Least Squares Algorithms for Time-of-Arrival-Based Mobile Location," IEEE Transactions on Signal Processing, vol. 52, No. 4, Apr. 2004, pp. 1121-1128.

Frazier et al., Fully-Drawn Carbon-Based Chemical Sensors on Organic and Inorganic Surfaces, Lab Chip. Oct. 21, 2014; 14(20): 4059-4066. doi:10.1039/c4lc00864b.

Alsheikh et al., "Machine Learning in Wireless Sensor Networks: Algorithms, Strategies, and Applications," arXiv:1405.4463v2 [cs.NI] Mar. 19, 2015.

Farooqui et al., "A paper based ink jet printed real time location tracking TAG," 2013 IEEE MTT-S International Microwave Symposium Digest (MTT).

Olyazadeh, Roya. (2012). Least Square Approach on Indoor Positioning Measurement Techniques.

Wimmer et al., Modular and deformable touch-sensitive surfaces based on time domain reflectometry, UIST 11 Proceedings of the 24th annual ACM symposium on User interface software and technology, pp. 517-526, Santa Barbara, California, USA—Oct. 1619, 2011.

Olberding et al., A cuttable multi-touch sensor, Proceeding UIST '13 Proceedings of the 26th annual ACM symposium on User interface software and technology. 245-254, St. Andrews, Scotland, United Kingdom—Oct. 8-11, 2013.

Zhang et al., Deep Neural Networks for wireless localization in indoor and outdoor environments, Neurocomputing 194 (2016)279-287.

Park et al., Improvement of Cross-Machine Directional Thickness Deviation for Uniform Pressure-Sensitive Adhesive _ayer in Roll-to-Roll Slot-Die Coating Process, International Journal of Precision Engineering and Manufacturing, vol. 16, No. 5, pp. 937-943, May 2015.

International Application No. PCT/US2018/064855, International Search Report and the Written Opinion dated Mar. 29, 2019, 12 pages.

International Application No. PCT/US2018/064919, Written Opinion of the International Searching Authority, dated Apr. 5, 2019, 7 pages.

International Application No. PCT/US2021/044078, International Search Report and Written Opinion dated Oct. 26, 2021 17 pages.

\* cited by examiner

PACKAGE SEALING TAPE TYPES WITH VARIED TRANSDUCER SAMPLING DENSITIES

This application is a continuation of pending U.S. patent application Ser. No. 17/102,338, filed on Nov. 23, 2020, which is a continuation of U.S. patent application Ser. No. 16/430,929 filed on Jun. 4, 2019, now U.S. Pat. No. 10,885,420. U.S. patent application Ser. No. 16/430,929 claims priority to U.S. Provisional Patent Application No. 62/680,716, filed Jun. 5, 2018, and is a continuation-in-part of U.S. patent application Ser. No. 16/409,589, filed May 10, 2019, now U.S. Pat. No. 10,902,310. U.S. patent application Ser. No. 16/409,589 claims priority to Provisional Patent App. No. 62/670,712, filed May 11, 2018. U.S. patent application Ser. No. 16/430,929 is also a continuation-in-part of U.S. patent application Ser. No. 16/383,353, filed Apr. 12, 2019, which is a continuation of U.S. patent application Ser. No. 15/842,861, filed Dec. 14, 2017, now U.S. Pat. No. 10,262,255, which claims priority to Provisional Patent Application No. 62/434,218, filed Dec. 14, 2016, and priority to Provisional Patent Application No. 62/435,207, filed Dec. 16, 2016. U.S. patent application Ser. No. 16/430,929 is also a continuation-in-part of U.S. patent application Ser. No. 15/842,867, filed Dec. 14, 2017, now U.S. Pat. No. 10,445,634, which claims priority to Provisional Patent Application No. 62/434,218, filed Dec. 14, 2016, and priority to Provisional Patent Application No. 62/435,207, filed Dec. 16, 2016. All of the above-referenced patent applications are incorporated herein in their entirety.

BACKGROUND

This application relates to flexible adhesive tape platforms for wireless transducing circuits and applications.

SUMMARY

This specification describes low-cost, multi-function flexible adhesive tape platforms for wireless communications and transducing circuits (also referred to herein as "adhesive tape platforms") with respective form factors that unobtrusively integrate one or more transducer and/or wireless communication circuits for a wide variety of different applications.

In an aspect, an adhesive tape platform integrates transducer and wireless communication components within a flexible adhesive tape structure in a way that not only provides a cost-effective platform for interconnecting, optimizing, and protecting the constituent components but also maintains the flexibility needed to function as an adhesive product that can be deployed seamlessly and unobtrusively into various applications and workflows, including sensing, notification, security, and object tracking applications, as well as asset management workflows such as manufacturing, storage, shipping, delivery, and other logistics associated with moving products and other physical objects.

The adhesive tape platforms can have a variety of form factors, including a multilayer roll or sheet that includes a plurality of divisible adhesive segments each of which includes wireless communications and transducing functionalities. Once deployed, each adhesive tape platform segment can function, for example, as an adhesive tape, label, sticker, decal, or the like and, at the same time, as an inconspicuous smart wireless communicator with transducing (e.g., sensing and/or actuating) functionality.

In an example, an adhesive tape platform segment includes a transducer (e.g., a sensor) configured to receive an input stimulus and generate an output signal based on the sensed input stimulus. The input stimulus may be any type of detectable physical stimulus, including for example, electromagnetic waves such as visible light, capacitance, magnetism, sound, heat, pressure, strain, force, torque, flow, motion, acceleration, position, humidity, moisture, gas, a substance such as a chemical, compound, or biological substance, and others.

In an example, an adhesive tape platform segment includes a transducer (e.g., an actuator) configured to receive an input signal and produce an output stimulus based on the received input signal. Example transducers include an audio speaker or ultrasound emitter, an electromagnetic wave emitter, such as a radio frequency (RF) emitter or a light source. The input signal may be any type of signal that is compatible with the output transducer, including digital and analog electrical signals (e.g., alternating current, direct current, Global Positioning System (GPS) coordinates, etc.), one or more mechanical linkages controlling an actuator, such as a valve, etc.

In an example, an adhesive tape platform segment can track location information either autonomously or collectively with other activated segments. In an autonomous mode of operation, an adhesive tape platform segment can be configured to communicate with a variety of different wireless locationing systems and equipment to determine or assist in determining information relating to its geographic or relative location. In a collective mode of operation, a set of segments can communicate with one another to self-organize and self-configure into, for example, a mesh network and, thereby, create mechanisms or opportunities for acquiring and/or sharing acquired location information in or across areas that are not supported by existing infrastructure equipment.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

Figure 1A:
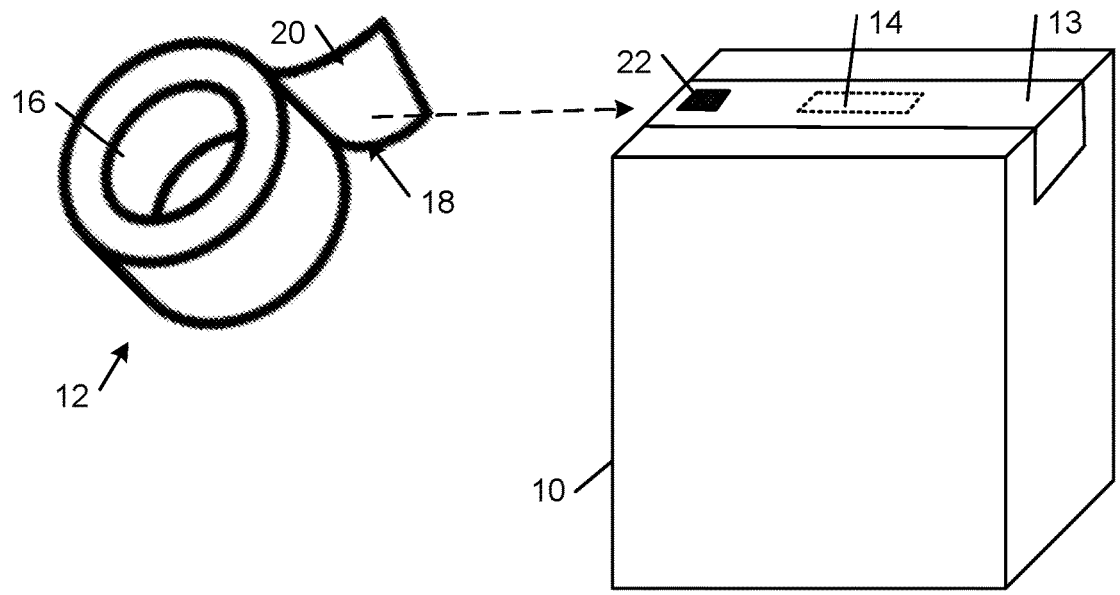
FIG. 1A is a diagrammatic view of a package that has been sealed for shipment using a segment of an example adhesive tape platform dispensed from a roll.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

In the instant specification, an adhesive tape platform is described that includes a plurality of segments that can be separated from the adhesive product (e.g., by cutting, tearing, peeling, or the like) and adhesively attached to a variety of different surfaces to inconspicuously implement any of a wide variety of different wireless communications based transducing (e.g., sensing, actuating, etc.) applications. Examples of such applications include: event detection applications, monitoring applications, security applications, notification applications, and tracking applications, including inventory tracking, package tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information regarding characteristics of the state and or environment of, for example, an article, object, vehicle, or person, over time.

The instant specification also describes systems and processes for fabricating flexible multifunction adhesive tape platforms in efficient and low-cost ways. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, and tracking applications across heterogeneous environments.

FIG. 1A shows an example package 10 that is sealed for shipment using an example adhesive tape platform 12 that includes embedded components of a wireless transducing circuit 14. In this example, a length 13 of the adhesive tape platform 12 is dispensed from a roll 16 and affixed to the package 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the package 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., light reflective, light absorbing, and/or light emitting coatings or layers).

Figure 1B:
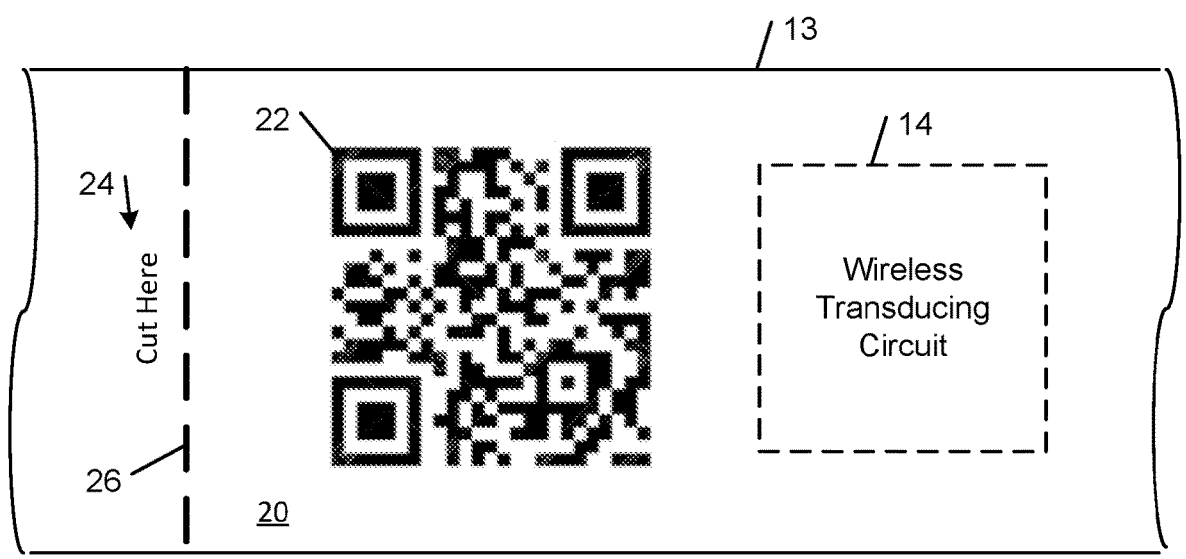
FIG. 1B is a diagrammatic top view of a portion of the segment of the example adhesive tape platform shown in FIG. 1A.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another.

In the illustrated example, the length 13 of the adhesive tape platform 12 includes a two-dimensional bar code 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the tracking functionality of the segments of the adhesive tape platform 12, the cut lines 26 typically demarcate the boundaries between adjacent segments at locations that are free of any components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the package 10 corresponds to a single segment of the adhesive tape platform 12. In other examples, the length of the adhesive tape platform 12 needed to seal a package or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or otherwise applying the length of the adhesive tape platform to the package 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2A:
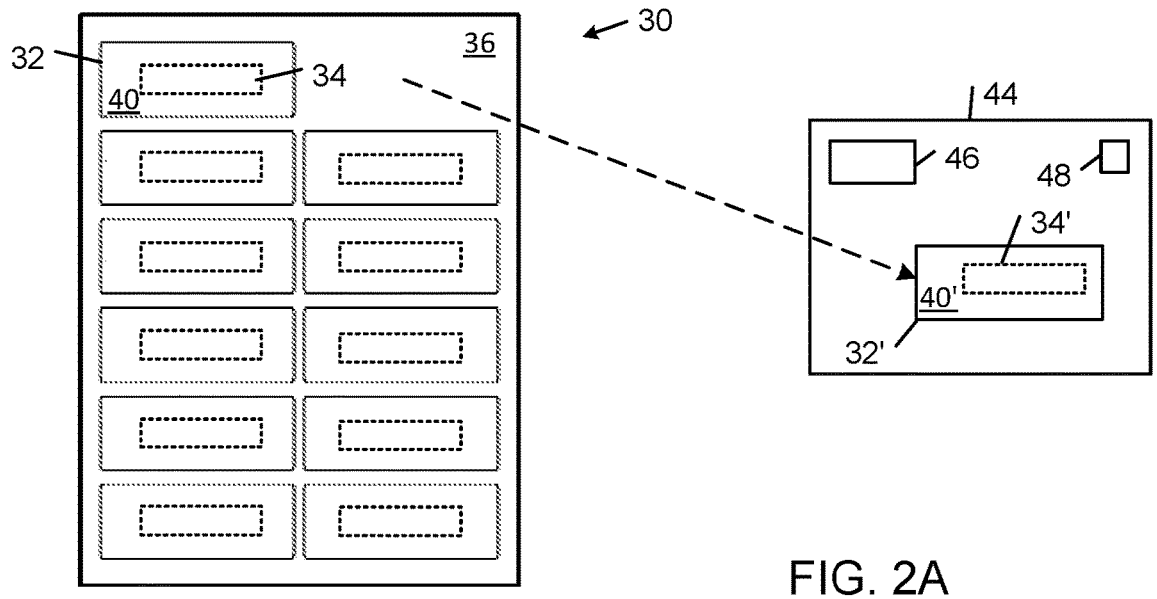
FIG. 2A is a diagrammatic view of an example of an envelope carrying a segment of an example adhesive tape platform dispensed from a backing sheet.

FIG. 2A shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 2B:
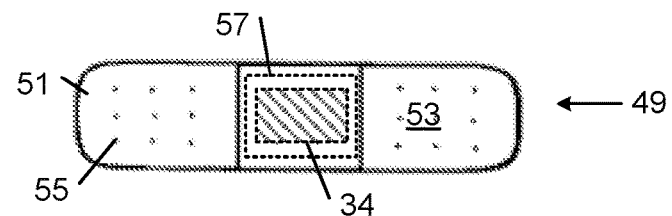
FIG. 2B is a diagrammatic top view of an example adhesive tape platform implemented as an adhesive bandage.

FIG. 2B shows a top view of an example adhesive tape platform implemented as an adhesive bandage 49. The adhesive bandage 49 includes a flexible layer 51 having a top side 53 and a bottom side (not shown). The top side 53 includes a flexible surface with a plurality of perforations 55. The bottom side includes a protective layer 57 in a central region of the bottom side of the adhesive bandage 49. The protective layer 57 typically includes gauze or a similar type of absorbent material. The bottom side also includes adhesive regions on either side of the central region 57. In the illustrated example, the wireless transducing circuit components 34 are integrated on one or more layers (e.g., a flexible circuit substrate) between the flexible layer 51 and the protective layer 57 of the adhesive bandage 49. In some examples, the wireless transducing circuit components 34 provide locationing functionality for tracking the geographic location of the adhesive bandage 49. In these examples, the transducing circuit components provide sensing functionality for monitoring the state of the adhesive bandage 49 or its ambient environment. In some examples, the wireless transducer components include a capacitive sensor that detects changes in the moisture content in the absorbent material of the adhesive bandage 49 and reports the change to a network node or service (e.g., network service 54) that notifies a person (e.g., a nurse or other caregiver) to change the bandage.

Figure 3:
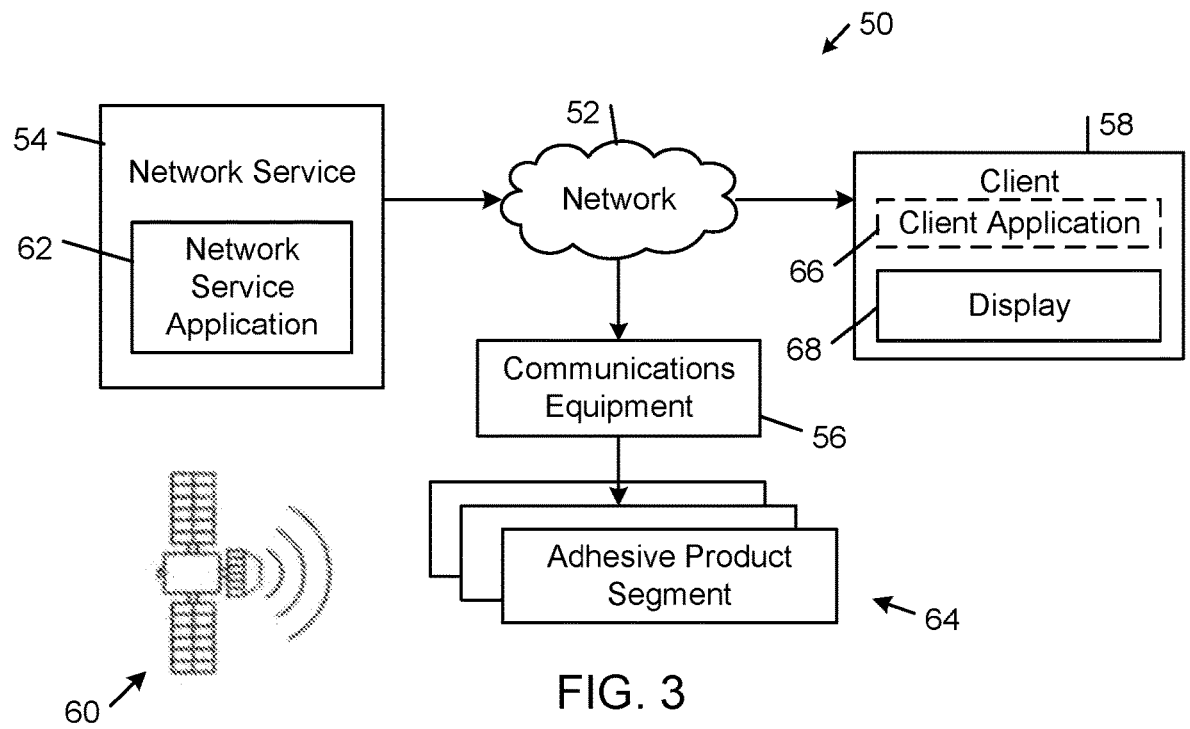
FIG. 3 is a diagrammatic view of an example of a network environment supporting communications with segments of an adhesive tape platform.

FIG. 3 shows an example network environment 50 that includes a network 52 that supports communications between a network service 54, communications equipment 56, and a client device 58. The network 52 includes one or more network communication systems and technologies, including any one or more of wide area networks, local area networks, public networks (e.g., the internet), private networks (e.g., intranets and extranets), wired networks, and wireless networks. The communications equipment 56 includes any one or more of (i) satellite based tracking systems 60 (e.g., GPS, GLONASS, and NAVSTAR) that transmit geolocation data that can be received by suitably equipped receivers in segments of an adhesive tape platform, (ii) cellular based systems that use mobile communication technologies (e.g., GSM, GPRS, CDMA, etc.) to implement one or more cell-based localization techniques, and (iii) communications equipment 56, such as wireless access points (e.g., Wi-Fi nodes, Bluetooth nodes, ZigBee nodes, etc.) and other shorter range localization technologies (e.g., ultrasonic localization and/or dead reckoning based on motion sensor measurements).

As explained in detail below, location data for one or more activated segments 64 of the adhesive tape platform can be obtained using one or more of the communications systems and technologies described above.

For example, a segment 64 of an adhesive tape platform that includes a GPS receiver is operable to receive location data (e.g., geolocation data) from the Global Positioning System (GPS). In this process, the adhesive tape platform segment 64 periodically monitors signals from multiple GPS satellites. Each signal contains information about the time the signal was transmitted and the position of the satellite at the time of transmission. Based on the location and time information for each of four or more satellites, the GPS receiver determines the geolocation of the adhesive tape platform segment 64 and the offset of its internal clock from true time. Depending on its configuration, the adhesive tape platform segment 64 can either forward the received GPS location data to the network service 54 to determine its geolocation, or first compute geolocation coordinates from the received GPS location data and report the computed geolocation coordinates to the network service 54. However, the adhesive tape platform segment 64 can only determine its GPS location when it is able to receive signals from at least four GPS satellites at the same time. As a result, GPS localization typically is limited or unavailable in urban environments and indoor locations.

Instead of or in addition to GPS localization, an adhesive tape platform segment 64 can be configured to determine or assist in determining its location using terrestrial locationing techniques. For example, Received Signal Strength Indicator (RSSI) techniques may be used to determine the location of an adhesive tape platform segment 64. These techniques include, for example, fingerprint matching, trilateration, and triangulation. In an example RSSI fingerprinting process, one or more predetermined radio maps of a target area are compared to geo-reference RSSI fingerprints that are obtained from measurements of at least three wireless signal sources (e.g., cellular towers or wireless access points) in the target area to ascertain the location of the adhesive tape platform segment 64. The predetermined radio maps typically are stored in a database that is accessible by the network service 54. In example RSSI triangulation and trilateration processes, the location of an adhesive tape platform segment 64 can be determined from measurements of signals transmitted from at least three omnidirectional wireless signal sources (e.g., cellular towers or wireless access points). Examples of the triangulation and trilateration localization techniques may involve use of one or more of time of arrival (TOA), angle of arrival (AOA), time difference of arrival (TDOA), and uplink-time difference of arrival (U-TDOA) techniques. RSSI fingerprint matching, trilateration, and triangulation techniques can be used with cellular and wireless access points that are configured to communicate with any of a variety of different communication standards and protocols, including GSM, CDMA, Wi-Fi, Bluetooth, Bluetooth Low Energy (BLE), LoRa, ZigBee, Z-wave, and RF.

In some examples, an adhesive tape platform segment 64 that includes a GSM/GPRS transceiver can scan GSM frequency bands for signals transmitted from one or more GSM cellular towers. For each signal received by the adhesive tape platform segment 64, the adhesive tape platform segment 64 can determine the signal strength and the identity of the cellular tower that transmitted the signal. The adhesive tape platform segment 64 can send the signal strength and transmitter identifier to the network service 54 to determine the location of the adhesive tape platform segment 64. If signal strength and transmitter identifier is available from only one cellular tower, the network service 54 can use nearest neighbor localization techniques to determine the location of the adhesive tape platform segment 64. If signal strength and transmitter identifier is received from two or more cellular towers, the network service 54 can use localization techniques, such as fingerprint matching, trilateration, and triangulation, to calculate the position of the adhesive tape platform segment 64.

In some examples, an adhesive tape platform segment 64 that includes a Wi-Fi (Wireless-Fidelity) transceiver can scan Wi-Fi frequency bands for signals transmitted from one or more Wi-Fi access points. For each signal received by the adhesive tape platform segment 64, the adhesive tape platform segment 64 can determine the signal strength and the identity of the access point that transmitted the signal. The adhesive tape platform segment 64 can send the signal strength and transmitter identifier information to the network service 54 to determine the location of the adhesive tape platform segment 64. If signal strength and transmitter identifier information is available from only one Wi-Fi access point, the network service 54 can use nearest neighbor localization techniques to determine a location of the adhesive tape platform segment 64. If signal strength and transmitter identifier information is received from two or more Wi-Fi access points, the network service 54 can use localization techniques, such as trilateration, and triangulation, to calculate the position of an adhesive tape platform segment 64. RSSI fingerprint matching also can be used to determine the location of the adhesive tape platform segment 64 in areas (e.g., indoor and outdoor locations, such as malls, warehouses, airports, and shipping ports) for which one or more radio maps have been generated.

In some examples, the wireless transceiver in the adhesive tape platform segment 64 can transmit a wireless signal (e.g., a Wi-Fi, Bluetooth, Bluetooth Low Energy, LoRa, ZigBee, Z-wave, and/or RF signal) that includes the identifier of the adhesive tape platform segment 64. The wireless signal can function as a beacon that can be detected by a mobile computing device (e.g., a mobile phone) that is suitably configured to ascertain the location of the source of the beacon. In some examples, a user (e.g., an operator affiliated with the network service 54) may use the mobile computing device to transmit a signal into an area (e.g., a warehouse) that includes the identifier of a target adhesive tape platform segment 64 and configures the target adhesive tape platform segment 64 to begin emitting the wireless beacon signal. In some examples, the target adhesive tape platform segment 64 will not begin emitting the wireless beacon signal until the user/operator self-authenticates with the network service 54.

The network service 54 includes one or more computing resources (e.g., server computers) that can be located in the same or different geographic locations. The network service may execute one or more of a variety of different applications, including event detection applications, monitoring applications, security applications, notification applications, and tracking/locationing applications.

In one example, the network service 54 executes a locationing application 62 to determine the locations of activated adhesive tape platform segments 64. In some examples, based on execution of the locationing application 62, the network service 54 receives location data from one or more of the adhesive tape platform segments 64. In some examples, the network service 54 processes the data received from adhesive tape platform segments 64 to determine the physical locations of the adhesive tape platform segments 64. For example, the adhesive tape platform segments 64 may be configured to obtain locationing information from signals received from a satellite system (e.g., GPS, GLONASS, and NAVSTAR), cell towers, or wireless access points, and send the locationing information to the network service 54 to ascertain the physical locations of the adhesive tape platform segments 64. In other examples, the adhesive tape platform segments 64 are configured to ascertain their respective physical locations from the signals received from a satellite system (e.g., GPS, GLONASS, and NAVSTAR), cell towers, or wireless access points, and to transmit their respective physical locations to the network service 54. In either or both cases, the network service 54 typically stores the locationing information and/or the determined physical location for each adhesive tape platform segment in association with the respective unique identifier of the adhesive tape platform segment. The stored data may be used by the network service 54 to determine time, location, and state (e.g., sensor based) information about the adhesive tape platform segments 64 and the objects or persons to which the adhesive tape platform segments 64 are attached. Examples of such information include tracking the environmental conditions or state of the current location of an adhesive tape platform segment 64, determining the physical route traveled by the adhesive tape platform segment 64 over time, and ascertaining stopover locations and durations.

As shown FIG. 3, the client device 58 includes a client application 66 and a display 68. The client application 66 establishes sessions with the network service 54 during which the client application obtains information regarding the states (e.g., locations) and events relating to the adhesive tape platform segments 64. In some examples, a user of the client device 58 must be authenticated before accessing the network service 54. In this process, the user typically presents multiple authentication factors to the system (e.g., user name and password). After the user is authenticated, the network service 54 transmits to the client device 58 data associated with the user's account, including information relating to the adhesive tape platform segments 64 that are associated with the user's account. The information may include, for example, the state (e.g., current location) and events relating to a particular adhesive tape platform segment 64, the physical route traveled by the adhesive tape platform segment 64 over time, stopover locations and durations, and state and/or changes in state information (as measured by one or more sensors associated with the adhesive tape platform segment 64). The information may be presented in a user interface on the display 68. State information (including location) may be presented in the user interface in any of a variety of different ways, including in a table, chart, or map. In some examples, the location and state data presented in the user interface are updated in real time.

Figure 4:
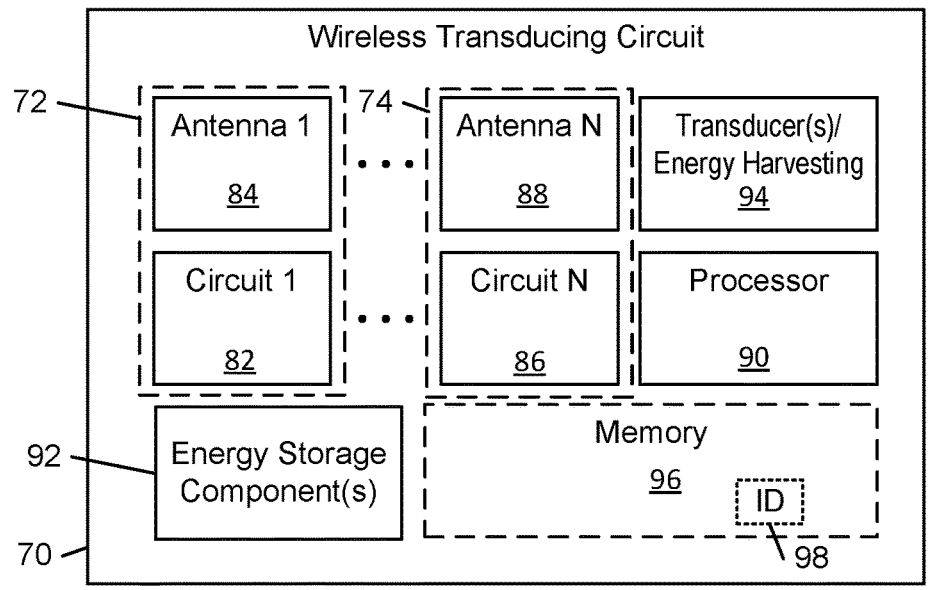
FIG. 4 is a schematic view of an example segment of an adhesive tape platform.

FIG. 4 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a light sensor (e.g., a photodiode or a camera), a sound sensor (e.g., a microphone), a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data (e.g., state, event, and localization data, and a unique identifier 98 associated with the wireless transducing circuit 70). In some examples, the memory 96 may be incorporated into one or more of the processor 90 or transducers 94, or may be a separate component that is integrated in the wireless transducing circuit 70 as shown in FIG. 4.

Figure 5A:
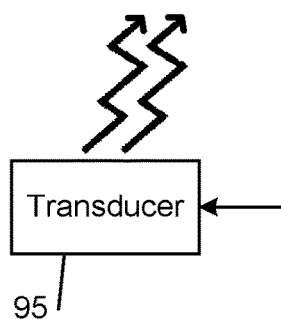
FIG. 5A is a diagrammatic view of an example transducer converting input energy received from an energy storage component to output energy.

Referring to FIG. 5A, in some examples, the one or more transducers 94 include one or more actuating (e.g., energy emitting) transducers 95 that convert input power from an energy storage component 97 into an output. Example energy emitting components of the adhesive tape platform include an optical emitter (e.g., a light emitting diode, a laser, etc.), an acoustic emitter (e.g., a loudspeaker or ultrasound generator), an electromagnetic wave emitter, and an odor emitter.

Figure 5B:
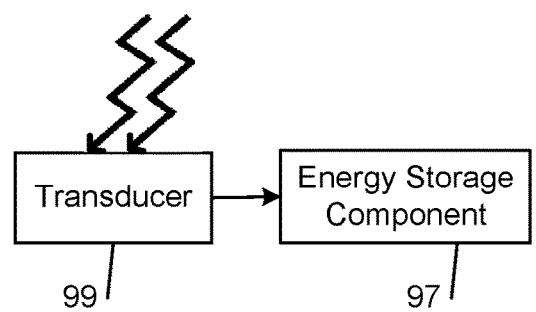
FIG. 5B is a diagrammatic view of an example transducer converting energy received from an external source to energy for charging an energy storage component.

Referring to FIG. 5B, in some examples, the one or more transducers 94 include one or more energy harvesting transducers 99 that convert input energy into electrical energy that is used to charge the energy storage component 97. Example energy harvesting components of the adhesive tape platform for recharging the one or more energy storage components 92 include at least one of electromagnetic wave harvesting (e.g., an electromagnetic wave detector, such as a radio frequency (RF) energy harvesting coil transducer), solar cell or photovoltaic harvesting, vibration harvesting, piezoelectric based harvesting, and sound (e.g., ultrasound) harvesting.

Although energy harvesting can be used to charge the energy storage components 92 of the adhesive tape platform 100, the timeframe typically needed to recharge the energy storage components oftentimes is not sufficient for continuous operation. For this reason, some embodiments manage power usage by managing the scheduling of energy intensive operations (e.g., data transmission and reception).

In some examples, the wireless transducing circuit 70 is configured as a one-time read tag. In these examples, the energy storage component 92 is sized and configured to store sufficient energy to enable the wireless transducer circuit 70 to capture one measurement and transmit the measurement data to a destination (e.g., a network service). In an anti-theft package tracking example, the adhesive tape platform 100 is used to seal a package containing one or more goods. Instead of configuring the adhesive tape platform 100 with an expensive source of power (e.g., a large or high power density battery) that is sufficient to periodically transmit its location (e.g., GPS coordinates) as the package being transported route from a source location on a scheduled shipping date to a destination location on a scheduled delivery date, the wireless transducer circuit 70 is configured with a low cost source of power that is sufficient to determine its geographic location (e.g., GPS coordinates or cell-based localization based on mobile communication technologies, e.g., GSM, GPRS, CDMA, etc.) and transmit its geographic location to the network service at a designated time on or after the scheduled delivery date (e.g., one day to one week after the scheduled delivery date). In this way, the network service potentially can determine whether or not a package has been stolen.

Each segment 70 of the adhesive tape platform 64 integrates components of a tracking system with a flexible adhesive structure in a way that not only provides a cost-effective platform for interconnecting, optimizing, and protecting the components of the tracking system but also maintains the flexibility needed to function as a flexible adhesive product (e.g., a functional flexible tape or pre-cut tape label) that can be deployed seamlessly and unobtrusively into various applications and workflows, including event detection application, monitoring applications, security applications, notification applications, and person and object tracking applications, and asset management workflows such as manufacturing, storage, delivery, and other logistics associated with products and other physical objects. In addition, in order to encourage the ubiquitous deployment of adhesive tape platform segments, the disclosed adhesive tape platforms are designed to be fabricated using cost-effective fabrication methods, including roll-to-roll and sheet-to-sheet fabrication processes.

In this regard, the components of an adhesive tape platform 64 are designed and arranged to optimize performance, flexibility, and robustness for each target application. This encompasses factors, such as material selection, component layout, and mechanical integrity of the integrated system. To this end, electronic design automation tools are used to optimize the design across the constituent layers of an adhesive tape platform given prescribed performance targets (e.g., mechanical integrity targets, electrical performance targets, and/or wireless communication performance targets). This includes simulations of electromagnetic wave behavior across layers, heat dissipation behavior, electrical parasitic behavior across layers (e.g., inductances, capacitances, and resistances), and mechanical behaviors (e.g., the impact of bending and impressing bonding patterns on the adhesive tape platform 64). Based on these simulations, process technology design rules are developed for designing adhesive tape platforms, including rules for integrating layers, rules for selecting the number of layers, and rules for selecting the types of layers (e.g., through interposer vias, component layers, cover layers, substrate layers, and adhesive layers). In some examples, design rules are developed regarding the layout of components in the different layers of an adhesive tape platform 64. For example, minimum spacing and/or proximity rules are developed for the placement of antennas, rigid components, flexible components, passive components, and active components. In these examples, rigid and active components, such as the communication circuits 82, 86 (e.g., receivers, transmitters, and transceivers) and the processor 90, can have larger minimum spacing requirements than flexible and passive components. In some examples, rigid components are spaced apart according to minimum spacing rules to satisfy mechanical integrity and flexibility performance targets. In some examples, active components are laid out according to minimum spacing rules to satisfy heat dissipation performance targets. In some examples, design rules are developed for hierarchical assembly of an adhesive tape platform by integrating smaller adhesive tape platform components to form a larger integrated adhesive tape platform system.

Figure 6:
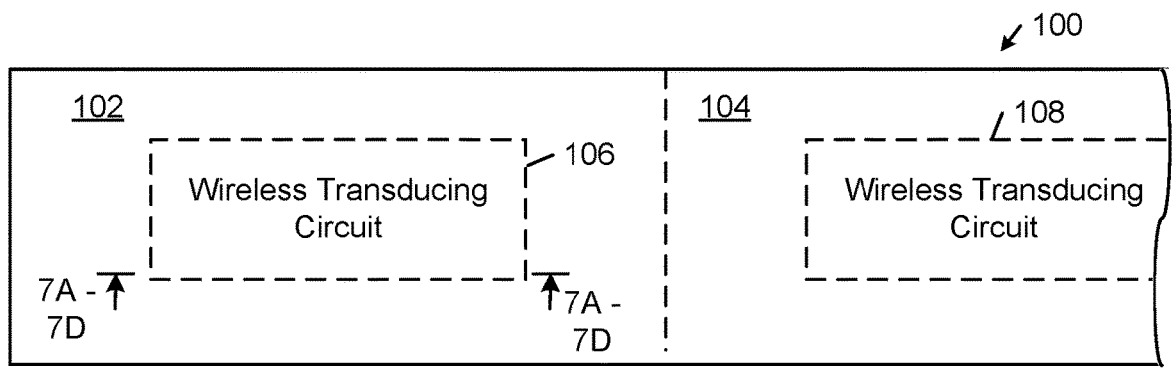
FIG. 6 is a diagrammatic top view of a length of an example adhesive tape platform.

FIG. 6 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 6) according to a roll-to-roll fabrication process is described in connection with FIGS. 6, 7A, and 7B of U.S. patent application Ser. No. 15/842,861, filed Dec. 14, 2017, the entirety of which application is incorporated herein by reference.

Figure 7A:
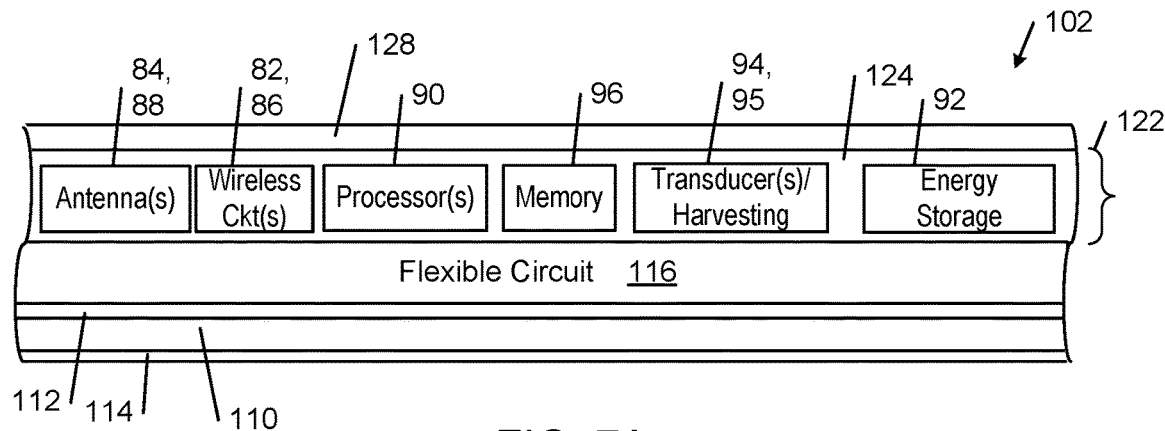
FIGS. 7A-7D show diagrammatic cross-sectional side views of portions of different respective adhesive tape platforms.

FIG. 7A shows a cross-sectional side view of a portion of an example segment 102 of the flexible adhesive tape platform 100 that includes a respective set of the components of the wireless transducing circuit 106. The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, the wireless circuit(s) 82, 86, the antenna(s) 84, 88, the transducer(s) 94, the memory 96, and other components in a device layer 122 to each other and to the energy storage/harvesting component(s) 92 and, thereby, enable the transducing, tracking and other functionalities of the flexible adhesive tape platform segment 102. In some examples, a flexible polymer layer 124 encapsulates the device layer 122 and thereby reduces the risk of damage that may result from the intrusion of contaminants and/or liquids (e.g., water). The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces on the flexible adhesive tape platform segment 102 during use. In some examples, a flexible cover 128 is bonded to the planarizing polymer 124 by an adhesive layer (not shown).

The flexible cover 128 and the flexible substrate 110 may have the same or different compositions depending on the intended application. The flexible cover 126 and the flexible substrate 110 typically include flexible film layers and/or paper substrates, which may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, these adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 126 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 122 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, one or more of the flexible antennas 84, 88, the circuits 82, 86, 116, and/or the processor(s) 90 may be integrated on the flexible battery substrate. In some examples, one or more of these other components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segment 102 shown in FIG. 7A, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the communication systems 72, 74, the processor 90, the one or more sensors 94, and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the sensors) on the front-side of the flexible circuit 116 to the electrodes of the flexible battery 116 via one or more through holes in the substrate of the flexible circuit 116.

Figure 7B:
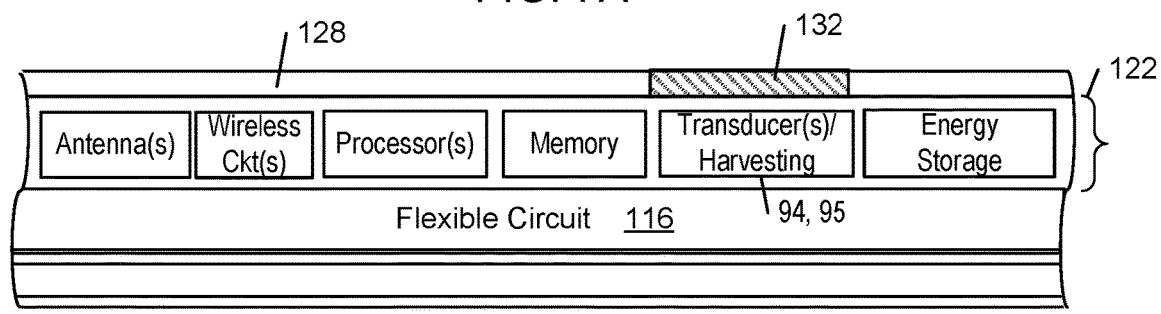
Figure 7C:
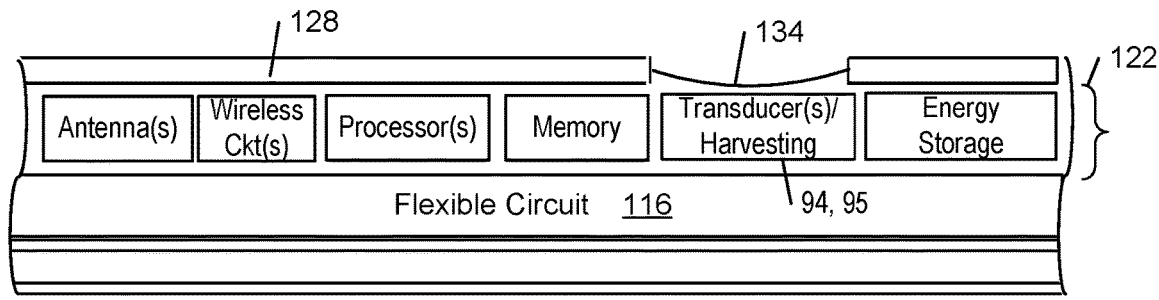
Figure 7D:
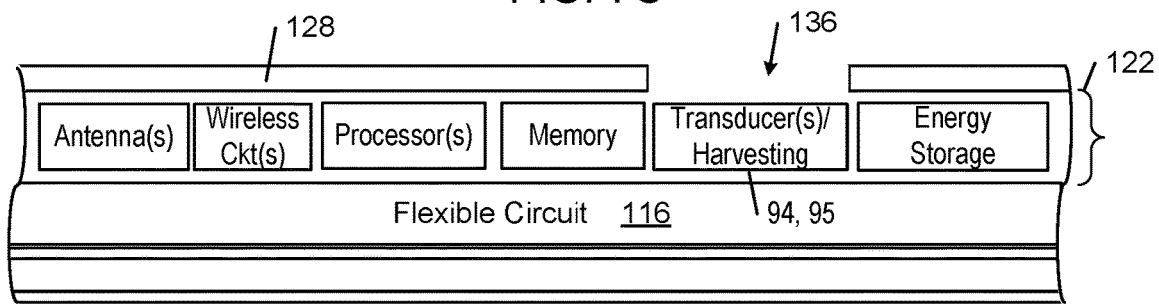

FIGS. 7B-7D show examples in which the cover layer 128 of the flexible adhesive tape platform 100 includes one or more interfacial regions over one or more of the transducers 94 that have features, properties, compositions, dimensions, and/or characteristics that are designed to improve the operating performance of the platform 100 for specific applications. In some examples, the flexible adhesive tape platform 100 includes multiple interfacial regions over respective transducers 94, which may be the same or different depending on the target applications.

FIG. 7B shows an example of the cover 128 that includes an opening in which is situated a window 132 that is positioned over one or more transducers 94. In an example, the one or more transducers include a light sensor (e.g., a photodiode or a camera), and the window 132 is optically transparent to light within the wavelength ranges detectable by the light sensor. In an example, the window 132 includes one or more optical lenses (e.g., a diffractive optical element) and/or filters for focusing and/or filtering incoming light onto light sensing regions of the light sensor for, e.g., sensing, surveillance, security, diagnostic, or energy harvesting applications. In an example, the one or more transducers 94 include a light emitter (e.g., a light emitting diode, a laser, or a camera flash), and the window 132 includes one or more optical lenses and/or filters for focusing and/or filtering outgoing light generated by the light emitter and passing through the window 132 into the external environment. In an example, the one or more transducers 94 include a radio frequency (RF) energy harvesting coil transducer, and the window 132 includes one or more properties, compositions, dimensions, characteristics, or features that match the impedance of incoming RF energy to the RF energy harvesting coil transducer. In an example, the one or more transducers 94 include a temperature sensor (e.g., a metal thin film resistance temperature sensor), and the window 132 includes properties, compositions, dimensions, characteristics, or features that improve thermal energy transfer from the external environment to the temperature sensor.

FIG. 7C shows an example of the cover 128 that includes an opening in which a membrane 134 is situated over one or more of the transducers 94. The membrane may be formed of an organic or inorganic compound, and may be flexible, semi-rigid, or rigid. In some examples, the membrane 134 provides mechanical and/or transduction support for detecting, filtering, and/or concentrating chemicals, compounds, pathogens, and other substances. In an example, a transducer 94 includes a humidity sensor and the membrane 134 protects the sensor opening from water and detrimental particulates, such as dust, that would otherwise degrade the performance of the humidity sensor. In some examples, a transducer 94 includes a chemical sensor or a biosensor that has a surface coated with an exposed layer of suitable material such as polymers, metals, and metal oxides that target specific analytes (e.g., chemicals or biological entities) that change the propagation, color, or other characteristics of the sensor in response to exposure to the target analytes. In some examples, one or more transducers 94 include a chemical sensor, a biosensor (e.g., a surface acoustic wave device), an optical sensor (e.g., an image sensor or camera) for detecting target color changes in the chemicals or biomarkers, or one or more optical emitters (e.g., a light emitting diode) for illuminating one or more of the target chemicals or biomarkers.

FIG. 7D shows an example of the cover 128 that includes an opening 136 over one or more of the transducers 94. Some examples correspond to the transducers described above in connection with FIG. 7C except that the membranes are incorporated into the transducers 94 instead of being integral components of the cover 128 as shown in FIG. 7C. In an example, the one or more transducers 94 include an audio device (e.g., a loudspeaker or microphone). In an example, the audio device includes a loudspeaker that emits a sound in response to the detection of an event (e.g., an acceleration above a threshold acceleration level, a sound above a threshold sound level, a torsion above a threshold torsion level, and/or a strain above a threshold level of strain). In an example, the loudspeaker includes a membrane that operates as a diaphragm by moving back-and-forth to produce sounds (e.g., a loud notification alert) in response to an input electrical signal (e.g., a signal generated in response to the detection of an event, such as a loud sound, the presence of smoke, a rapid acceleration or deceleration, etc.). In another example, the one or more transducers 94 include an input audio device (e.g., a microphone) that includes a membrane that operates as a diaphragm by moving back-and-forth in response to sound waves, and a coil attached to the diaphragm moves back-and-forth in relation to a magnetic field of a magnet to generate an electrical current in the coil that is indicative of sound levels in the vicinity of the membrane 134. In another example, the one or more transducers 94 include an image sensor (e.g., a camera) or a light source (e.g., an LED or laser).

The flexible adhesive tape platforms 100 described herein may be used in a wide variety of different applications, including logistics, sensing, tracking, locationing, warehousing, parking, safety, construction, event detection, road management and infrastructure, security, and healthcare. In some examples, the flexible adhesive tape platforms 100 are used in various aspects of logistics management, including sealing packages, transporting packages, tracking packages, monitoring the conditions of packages, inventorying packages, and verifying package security. In these examples, the sealed packages typically are transported from one location to another by truck, train, ship, or aircraft.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 that include different respective sampling densities in order to seal different package sizes with a desired number of wireless transducing circuits. In particular, the number of wireless transducing circuits per package size is given by the product of the sampling density specified for the adhesive tape platform and the respective size of the adhesive tape platform 100 needed to seal the package. This allows an automated packaging system to select the appropriate type of flexible adhesive tape platform 100 to use for sealing a given package with the desired redundancy (if any) in the number of wireless transducer circuits 70. In some example applications (e.g., shipping low value goods), only one wireless transducing circuit 70 is used per package, whereas in other applications (e.g., shipping high value goods) multiple wireless transducing circuits 70 are used per package. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Some logistics applications do not require tracking and/or sensor data for every package shipped. Instead, sufficient information for decision-making can be obtained by collecting data from a sample of the packages shipped. In these example, a substantial reduction in shipping costs can be realized by selecting a sampling density of the deployed wireless transducing circuits 70 that achieves a target tracked package sampling rate that is less than unity. In these embodiments, some packages would not be tracked or monitored. However, the sample size can be selected to be sufficient to make inferences about the total population of packages shipped with a desired level of accuracy.

Figure 8A:
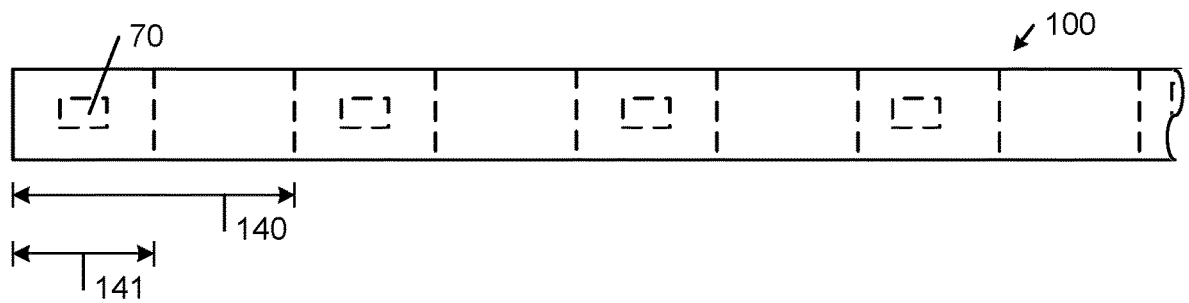
FIGS. 8A-8D show diagrammatic top views of respective lengths of examples of different respective flexible adhesive tape platforms.

For example, FIG. 8A shows an example length of the flexible adhesive tape platform 100 in which the sampling density is 0.5 (i.e., one wireless transducing circuit per two unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, half of the packages would be sealed with a length of the flexible adhesive platform 100 that includes wireless transducing circuits 70.

Figure 8B:
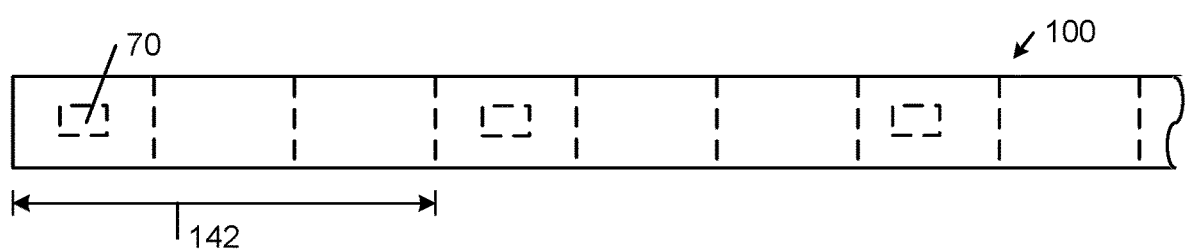

FIG. 8B shows an example length of the flexible adhesive tape platform 100 in which the sampling density is one-third (i.e., one wireless transducing circuit per three unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, one third of the packages would be sealed with a length of the flexible adhesive platform 100 that includes wireless transducing circuits 70.

Figure 8C:
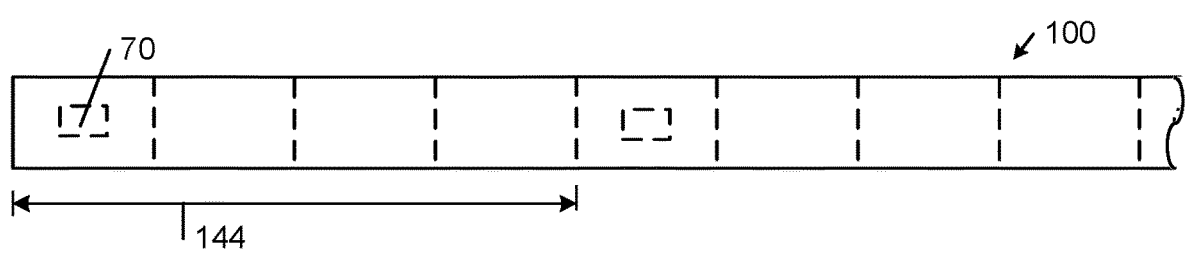

FIG. 8C shows an example length of the flexible adhesive tape platform 100 in which the sampling density is 0.25 (i.e., one wireless transducing circuit per four unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, one fourth of the packages be sealed with a length of the flexible adhesive platform 100 that includes wireless transducing circuits 70.

Figure 8D:
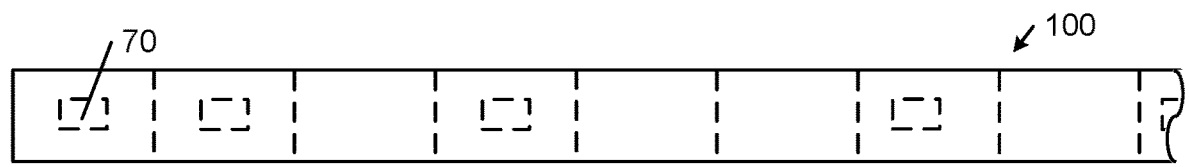

FIG. 8D shows an example length of the flexible adhesive tape platform 100 in which the sampling density is 0.25 (i.e., one wireless transducing circuit per two unit lengths 141 of the flexible adhesive tape platform 100). In this example, the wireless transducing circuits 70 are pseudo randomly distributed along the length of the flexible adhesive tape platform 100 according to a probability distribution. Assuming the unit length corresponds to the length of the flexible adhesive tape platform 100 needed to seal a package and the flexible adhesive tape platform 100 is cut along the dashed lines, one half of the packages would be sealed with a length of the flexible adhesive platform 100 that includes wireless transducing circuits 70.

In the examples shown in FIGS. 8A-8D, a plurality of wireless transducing circuits 70 is distributed across the continuous flexible adhesive tape platforms 100 according to a respective sampling density. Each wireless transducing circuit 70 includes an antenna, a wireless communications circuit coupled to the antenna, a transducer, a controller electrically connected to the wireless communications circuit and the transducer, and an energy source connected to the controller, the transducer, and the wireless communications circuit. In some examples, the wireless transducing circuits are uniform in function and composition. In some examples, the sampling density is the density of wireless transducing circuits 70 as a function of a unit size of the continuous flexible adhesive tape platform. In some examples, the wireless transducing circuits are interspersed among regions of the continuous flexible adhesive tape platform 100 that are free of any wireless transducing circuits. In some applications, the wireless transducing circuits 70 are interspersed among the regions of the continuous flexible adhesive tape platform 100 that are free of any wireless transducing circuits according to a linear sampling density. In some examples, each of the regions of the continuous flexible adhesive tape platform 100 that are free of any wireless transducing circuits 70 is free of active electrical components. In other applications, the wireless transducing circuits 70 are interspersed among the regions of the continuous flexible adhesive tape platform 100 that are free of any wireless transducing circuits 70 according to an areal sampling density. In some examples, the wireless transducing circuits 70 are distributed at regular intervals along the continuous flexible adhesive tape platform 100. In some examples, the wireless transducing circuits 70 are distributed across the continuous flexible adhesive tape platform 100 according to a probability distribution. In some examples, the continuous flexible adhesive tape platform 100 is carried on a cylindrical tape core. In some examples, the regions of the continuous flexible adhesive tape platform 100 that include wireless transducing circuits 70 are visually indistinguishable from other regions of the continuous flexible adhesive tape platform 100.

In some examples, multiple different types continuous flexible adhesive tape platforms 100 are bundled together and packaged as a set. In these examples, the continuous flexible adhesive tape platforms 100 typically are carried on respective cylindrical tape cores and include respective pluralities of wireless transducing circuits 70 distributed across the respective platforms 100 according to respective sampling densities at least two of which are different. In some examples, a first continuous flexible adhesive tape platform 100 in the set includes a backing that includes a first visible marking and a second continuous flexible adhesive tape platform includes a backing that includes a second visible marking that is different from the first visible marking. In some examples, the first and second continuous flexible adhesive tape platforms are color-coded differently (e.g., the backing of different tape platforms are different respective colors).

In some examples, the continuous flexible adhesive tape platforms 100 are used to monitor packages. In accordance with one example, unit size portions of a continuous flexible adhesive tape platform 100 are dispensed, where the continuous flexible adhesive tape platform 100 includes a plurality of wireless transducing circuits 70 distributed across the platform according to a sampling density of wireless transducing circuits 70 as a function of the unit size portions of the continuous flexible adhesive tape platform and the sampling density is less than 1. The dispensed portion of the continuous flexible adhesive tape platform is affixed to seal a package. A network node of a network service (e.g., the network service 54 of an inventory management system) establishes a wireless connection with the wireless transducing circuit 70 in the affixed dispensed portion of continuous flexible adhesive tape platform. Based on a successful establishment of the wireless connection with the wireless transducing circuit 70, a unique identifier of the wireless transducing circuit and transducer data from the wireless transducing circuit are obtained. The obtained transducer data is reported in association with the unique identifier to a network node of a network service (e.g., the network service 54 of an inventory management system). In some examples, the obtained transducer data includes geographic location data. In some examples the obtained transducer data includes sensor data characterizing ambient conditions in the vicinity of the dispensed portion of the continuous flexible adhesive tape platform 100.

Because battery power is finite and the power needs of any particular adhesive tape platform segment generally is unknown, some examples of the adhesive tape platform segments are preconfigured in a power-off state and remain in the power-off state until a predetermined event occurs. In some cases, the predetermined event indicates that the adhesive tape platform segment has been deployed for use in the field. Example events include cutting a segment of an adhesive tape platform from a roll, bending a segment of an adhesive tape platform as it is being peeled off of a roll, separating a segment of an adhesive tape platform from a backing sheet, and detecting a change in state of the adhesive tape platform or its environment. In some examples, a label is affixed to packaging containing the continuous flexible adhesive tape platform 100, where the label has markings (e.g., text and/or bar code) that include an indication of the sampling density of wireless transducing circuits as a function of a unit size of the continuous flexible adhesive tape platform. In some examples, the unit size corresponds to a length dimension; in other examples the unit size corresponds to an areal dimension.

Figure 9A:
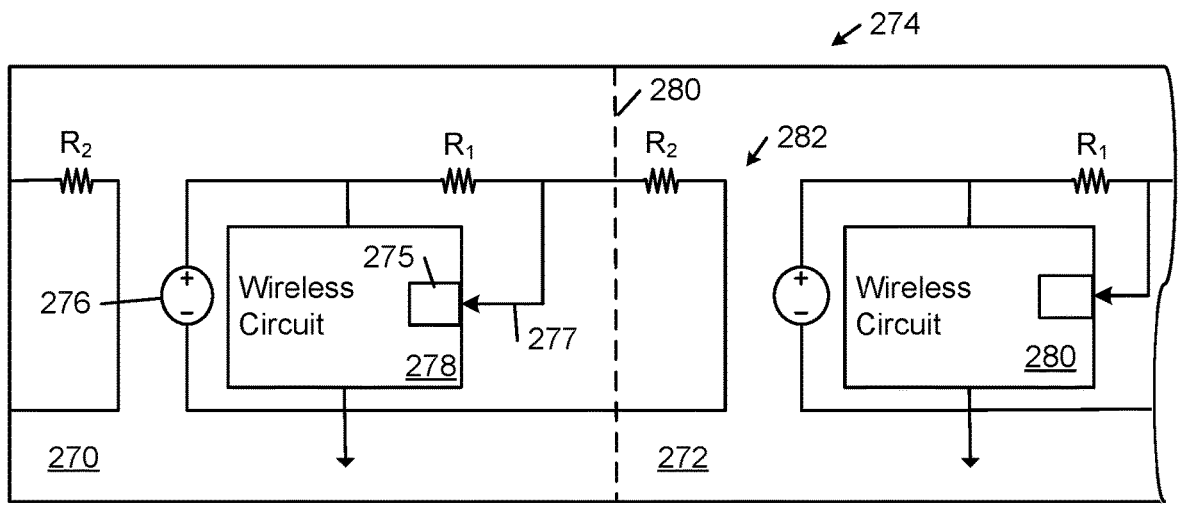
FIG. 9A is a diagrammatic top view of a length of an example flexible adhesive tape platform.

Referring to FIG. 9A, in some examples, each of one or more of the segments 270, 272 of a flexible adhesive tape platform 274 includes a respective wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors $R_1$ and $R_2$. As a result, the voltage on the wake node 270 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance vale of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 9B:
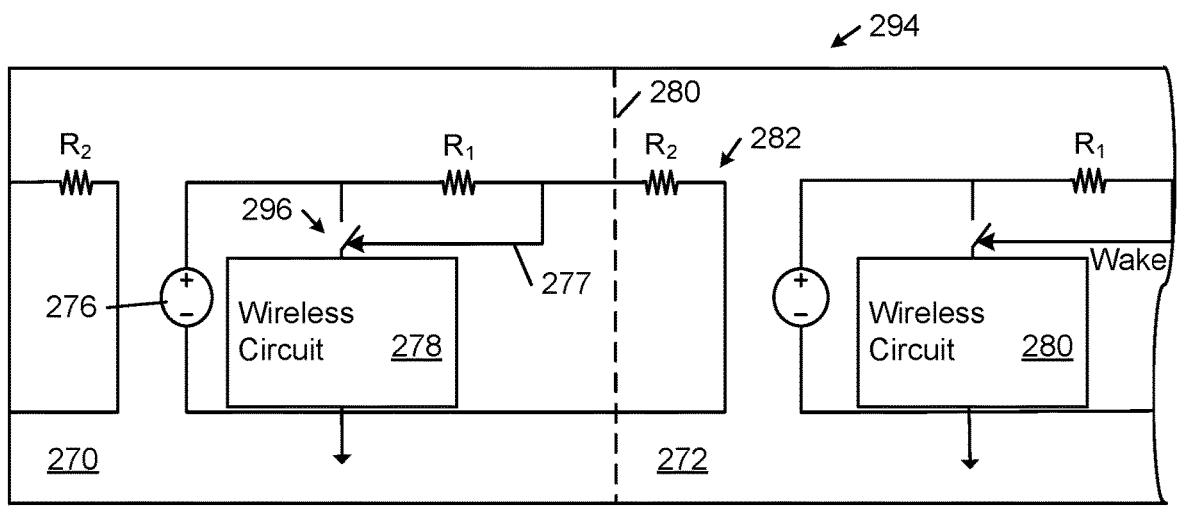
FIG. 9B is a diagrammatic top view of a length of an example flexible adhesive tape platform.

FIG. 9B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 9A, except that the wake circuit 275 is replaced by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors $R_1$ and $R_2$. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 9C:
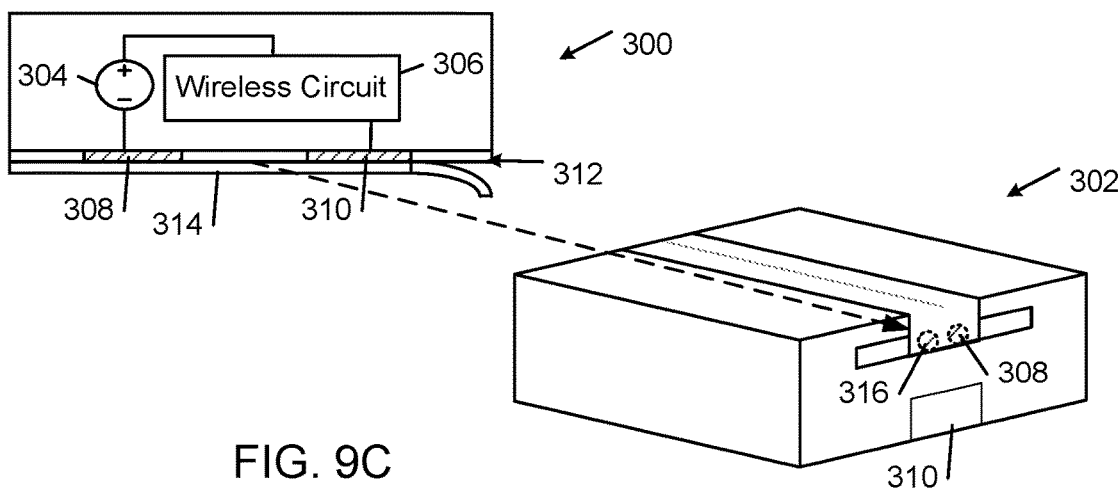
FIG. 9C is diagrammatic cross-sectional side view of an example flexible adhesive tape platform and an example package.

FIG. 9C shows a diagrammatic cross-sectional front view of an example adhesive tape platform 300 and a perspective view of an example package 302. Instead of activating the adhesive tape platform in response to separating a segment of the adhesive tape platform from a roll or a sheet of the adhesive tape platform, this example is configured to supply power from the energy source 302 to turn on the tracking circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the package 302. When the adhesive backside of the adhesive tape platform 300 is adhered to the package with the exposed terminals 308, 310 aligned and in contact with the electrically conductive region 316 on the package 302, an electrical connection is created through the electrically conductive region 316 between the exposed terminals 308, 310 that completes the circuit and turns on the tracking circuit 306. In particular embodiments, the power terminals 308, 310 are electrically connected to any respective nodes of the tracking circuit 306 that would result in the activation of the tracking circuit 306 in response to the creation of an electrical connection between the power terminals 308, 310.

In some examples, after an adhesive tape platform segment is turned on, it will communicate with the network service 54 to confirm that the user/operator who is associated with the adhesive tape platform segment is an authorized user who has authenticated himself or herself to the network service 54. In these examples, if the adhesive tape platform segment cannot confirm that the user/operator is an authorized user, the adhesive tape platform segment will turn itself off.

Figure 10:
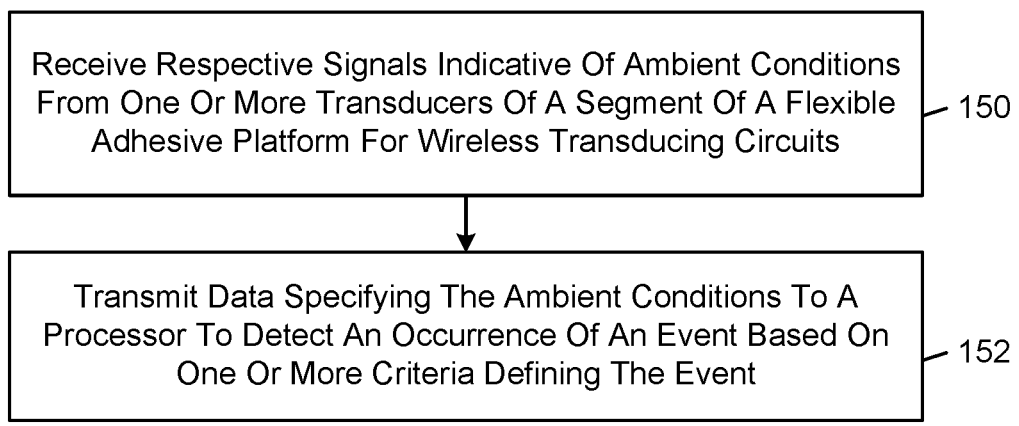
FIG. 10 is a flow diagram of an example process for detecting the occurrence of an event by an example flexible adhesive tape platform.

FIG. 10 shows an example method of detecting the occurrence of an event in the vicinity of an adhesive tape platform segment 102. Respective signals indicative of ambient conditions are received from one or more transducers of a segment of a flexible adhesive platform 100 for wireless transducing circuits 70 (FIG. 9, block 150). In some examples, one or more transducers that are integrated into or mechanically coupled to adhesive tape platform segment 102 receive input stimulus and produce therefrom output signals indicative of conditions detected by one or more of the transducers. Data specifying the conditions near the adhesive tape platform is transmitted to a processor that detects an occurrence of an event (FIG. 10, block 152). In some examples, the processor (e.g., a computer of the network service 54, the client computer 58, or the adhesive tape platform segment 102) detects the occurrence of the event by processing the data specifying the detected conditions using one or more of a trained machine learning classification algorithm, a deterministic algorithm that applies one or more criteria defining the event, and/or a heuristic.

After a particular event has been detected, one or more of the network service 54, the client computer 58, and the adhesive tape platform segment 102 can respond in a variety of different ways depending on the detected event type and, in some cases, the context of the detected event. For example, one or more of the network service 54, the client computer 58, and the adhesive tape platform segment 102 are configured to generate a respective notification.

In an example scenario, the detected event relates to a crime or potential harm to a person (e.g., a rapid acceleration or deceleration indicating a car accident or a fall, smoke or other harmful chemicals, a rapid rise in the detected ambient temperature), the adhesive tape platform segment 102 emits an audible alarm to alert nearby persons and automatically places an automated call to emergency services in a context that is detected as an event by a trained machine learning model, a deterministic algorithm that applies one or more criteria defining the event, and/or a heuristic. In some examples, the adhesive tape platform segment 102 also transmits a notification of the event to the network service 54, which can take appropriate action depending on the nature of the event (e.g., the network service 54 can call emergency services).

In another example scenario, the network service 54 tracks an adhesive tape platform segment (e.g., adhesive bandage 49 shown in FIG. 2B) that is known to be associated with a child, and issues an alert to the network service 54 or emergency services when the child is determined to be outside a permitted geographic (e.g., geo-fenced) area or is determined to be near or in an unsafe location (e.g., a swimming pool, highway, or construction site) in a context that is detected as an event by a trained machine learning model, a deterministic algorithm that applies one or more criteria defining the event, and/or a heuristic.

Figure 11:
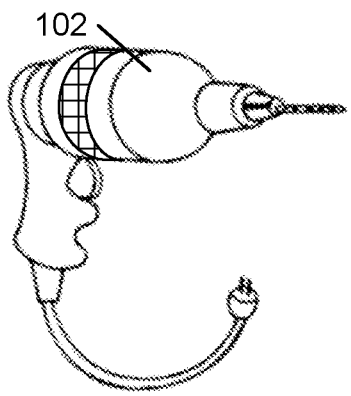
FIG. 11 is a diagrammatic view of an example flexible adhesive tape platform adhered to an example of construction equipment.

Referring to FIG. 11, in another example scenario, the network service 54 tracks an adhesive tape platform segment 102 that is associated with construction equipment—including power tools such as drills 156 and jackhammers, and forklifts, bulldozers, and other vehicles—and issues a potential theft alert to a designated security service or emergency services when the construction equipment is determined to be outside a permitted geographic (e.g., geo-fenced) area (e.g., the designated construction site) and/or the adhesive tape platform segment 102 stops transmitting a regular heartbeat signal in a context that is detected as an event by a trained machine learning model, a deterministic algorithm that applies one or more criteria defining the event, or a heuristic.

Figure 12A:
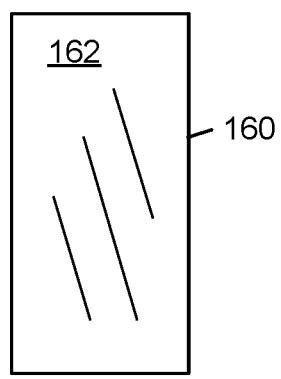
FIG. 12A is a diagrammatic view of an example flexible adhesive tape platform that includes a light reflective surface.

FIG. 12A shows an example adhesive tape platform segment 160 that includes a light reflective surface 162. In an example, the light reflective surface 162 includes a retroreflective material. In some examples, the retroreflective material is incorporated into adhesive tape platform segment 160 during manufacture. In some of these examples, the retroreflective material is coated on the cover of an adhesive tape platform 100. In other examples, an adhesive retroreflective tape is formed by coating a first tape substrate with the retroreflective material, and then the adhesive retroreflective tape is affixed to the adhesive tape platform segment 160 to form a composite tape platform 100. The size and shape of the adhesive tape platform 160 may be incorporated into a variety of different applications, including traffic management (e.g., reflective cones and barrels, and signage). In the illustrated example, the adhesive wireless communications and transducer platform segment 160 has a rectangular shape that is sized to fit on a fire extinguisher 164 (see FIG. 12B). In the illustrated example, the adhesive wireless communications and transducer platform segment 160 includes a removable backing layer that must be peeled off before adhering the segment 160 to the fire extinguisher 164.

Figure 12B:
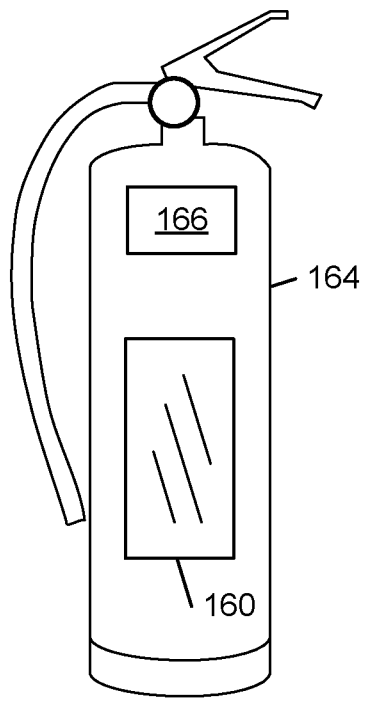
FIG. 12B is a diagrammatic view of examples of the flexible adhesive tape platform of FIG. 12A mounted on a fire extinguisher.

Referring to FIG. 12B, in the illustrated example, the fire extinguisher 164 includes two adhesive reflectors 160 and 166. In an example, both adhesive reflectors 160, 166 are adhesive tape platform segments 160, which may have the same or different sets of wireless communications and transducing components 70. In this way, the adhesive reflectors 160, 166 can provide redundant or complementary sets of wireless communication and transducing components. In another example, only the top adhesive reflector 166 is implemented by an adhesive wireless communications and transducer platform segment; a conventional adhesive label implements the bottom adhesive reflector 160.

In some examples, the network service 54 is configured to detect events relating to the traffic cone 164 by monitoring one or both of the adhesive tape platform segments 160, 166. In an example scenario, the network service 54 issues an alert to a designated maintenance service, security service, or emergency services when the traffic cone is determined to be outside a permitted geographic (e.g., geo-fenced) area (e.g., the designated road or construction site), the adhesive tape platform segment 160 stops transmitting a regular heartbeat signal, or a loud sound and/or rapid acceleration was reported by one or both of the adhesive tape platform segments 160, 166 in a context that is detected as an event by a trained machine learning model, a deterministic algorithm that applies one or more criteria defining the event, and/or a heuristic.

In some examples, the network service 54 is configured to detect events relating to construction and traffic control barrels. In some of these examples, one or more of the barrels respectively include one or more adhesive reflectors of the type described above in connection with FIGS. 12A and 12B, which include retroreflective material incorporated into one or more adhesive tape platform segments. In some examples, the adhesive tape platform segments include one or more transducers for monitoring the ambient environment. In some examples, a retroreflective adhesive tape platform segment includes an accelerometer and/or a microphone. In these examples, the network service 54 is configured to detect events relating to a traffic control barrel by monitoring one or more of the adhesive tape platform segments affixed to the barrel. In an example scenario, the network service 54 issues an alert to a designated maintenance service, security service, or emergency services when a loud sound, rapid acceleration, and/or barrel movement outside a designated geographic zone was reported by one or more of the adhesive tape platform segments 160, 166 in a context that is detected as a car crash event, a barrel tip-over event, or a barrel theft event by a trained machine learning model, a deterministic algorithm that applies one or more criteria defining the event, and/or a heuristic. In some examples, one or both of the network service 54 and the adhesive tape platform is configured to transmit a wireless communication to a designated telephone number or URL associated with, e.g., a road or highway management service.

Figure 13:
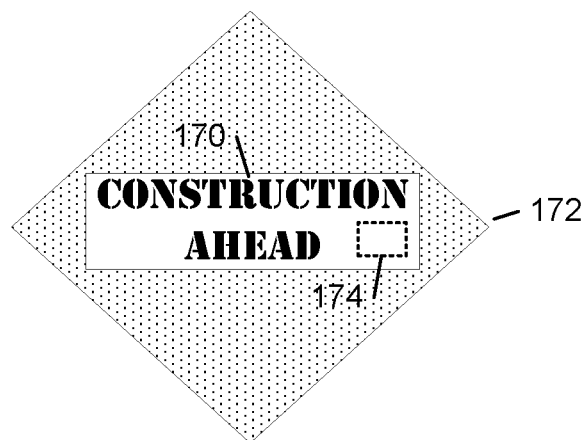
FIG. 13 is a diagrammatic view of an example flexible adhesive tape platform in the form of a label adhered to an example traffic sign and containing reflective lettering.

FIG. 13 shows an example adhesive tape platform 102 in the form of a label 170 containing reflective lettering adhered to a traffic sign 172. In an example scenario, the adhesive tape platform segment 170 includes an image sensor (e.g., a camera) behind a transparent window 174 in the cover of the adhesive tape platform 170. In this example, the adhesive tape platform 170 is configured to detect red light, speed, lane, and other traffic violations in a context that is detected as an event by a trained machine learning model, a deterministic algorithm that applies one or more criteria defining the event, and/or a heuristic. In some examples, the adhesive tape platform 170 is configured to report a count of the number of vehicles that pass by the traffic sign 172.

Figure 14:
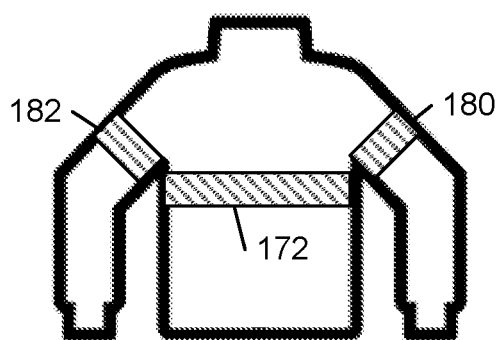
FIG. 14 is a diagrammatic view of an example of flexible adhesive tape platform adhered to an example of clothing.

FIG. 14 shows an example of three adhesive tape platforms 180, 182, 184 integrated with (e.g., adhered to) to an example of clothing (e.g., a sweat shirt or a jacket).

Figure 15:
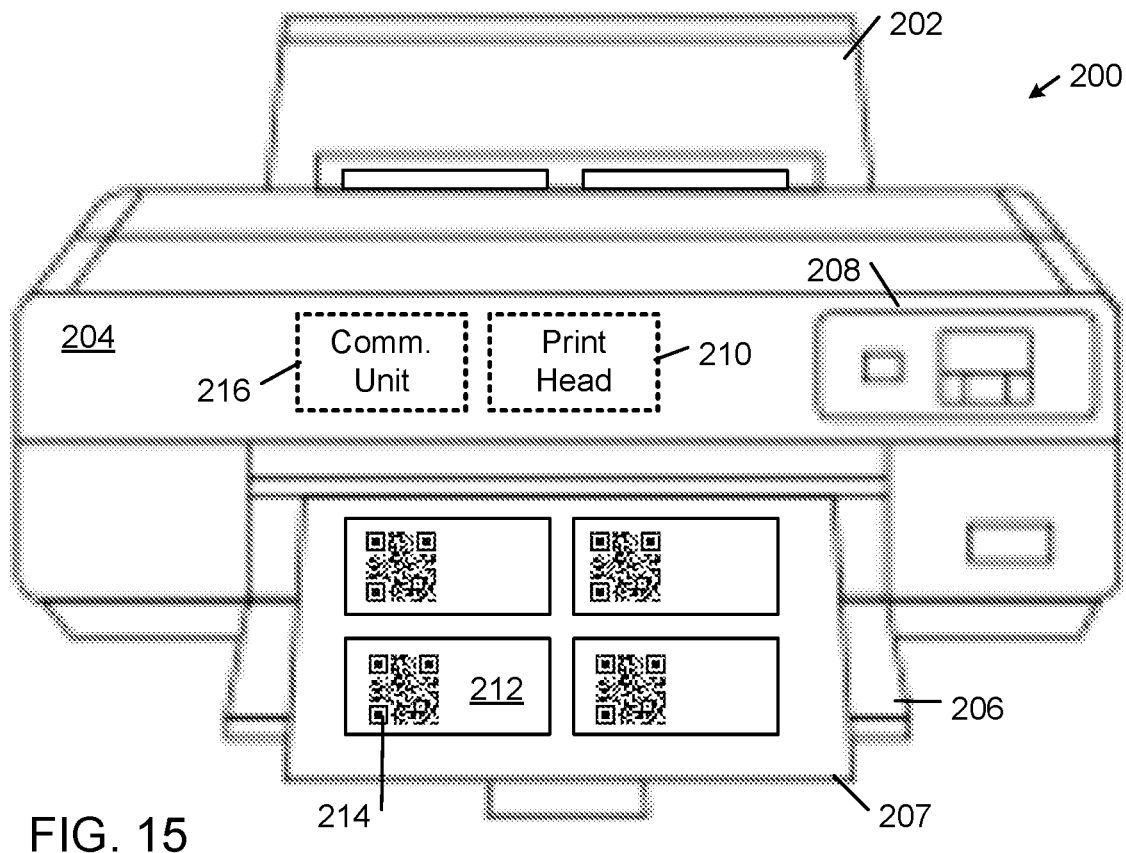
FIG. 15 is a diagrammatic view of an example printing system.

FIG. 15 shows an example of a printing apparatus 200 (e.g., an inkjet printer, a laser printer, etc.). In the illustrated example, the printing apparatus 200 includes an output tray 206 and a control panel 208 with a display and operation controls at the font of the main printer body 204, and an input tray 202 or cassette that is attached to the back of the main printer body 204. The input tray 202 is coupled a feed mechanism (not shown) that feeds sheets of adhesive product 207 from a stack of adhesive product sheets in the tray into the main printer body 204 for printing, and the output tray 206 is configured to receive the printed sheets of the adhesive product 207. In other examples, the printing apparatus 200 includes an input mechanism for feeding a continuous sheet of the adhesive product from a roll into the main printer body 204 for printing, and an output mechanism for receiving the printed adhesive product on an output roll. In some examples, each adhesive product sheet and roll includes multiple segments of adhesive product.

The main printer body 204 includes a print head 210 that is configured to applying a marking substance (e.g., ink or toner) to the top surface of the adhesive product while the print head 210 reciprocates on a carriage (not shown) in a direction substantially orthogonal with respect to the direction in which the adhesive product is fed past the print head 210 in the main printer body 204. In the illustrative example shown in FIG. 14, the adhesive product 207 includes a sheet of adhesive tape platform segments, each of which is marked with a different respective bar code (e.g., a two-dimensional barcode).

Figure 16A:
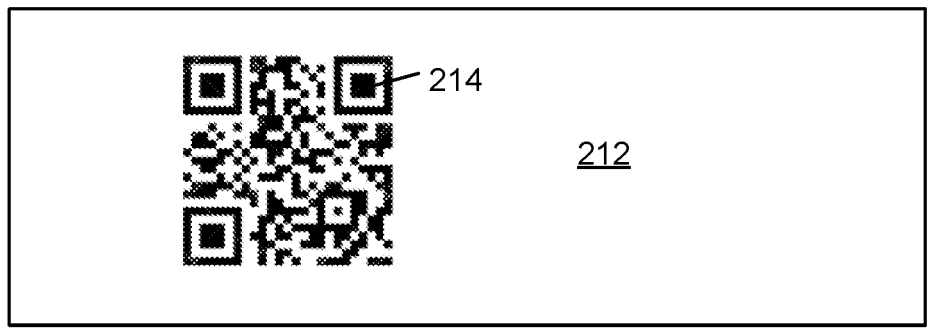
FIG. 16A is a diagrammatic view of a top surface of an example segment of an adhesive tape platform.
Figure 16B:
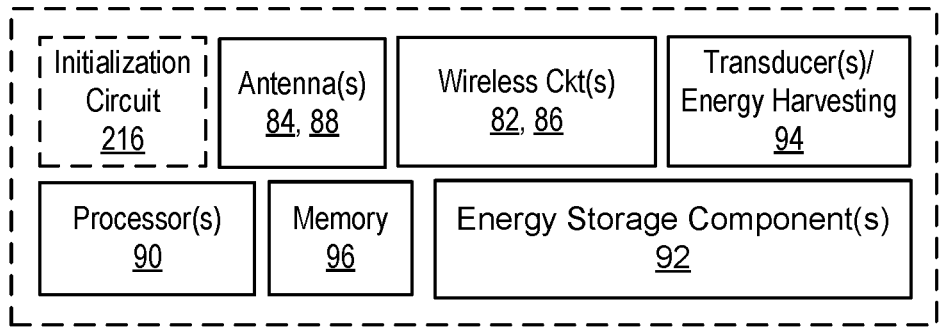
FIG. 16B is a diagrammatic view of components of the example segment of the adhesive tape platform shown in FIG. 16A.
Figure 17:
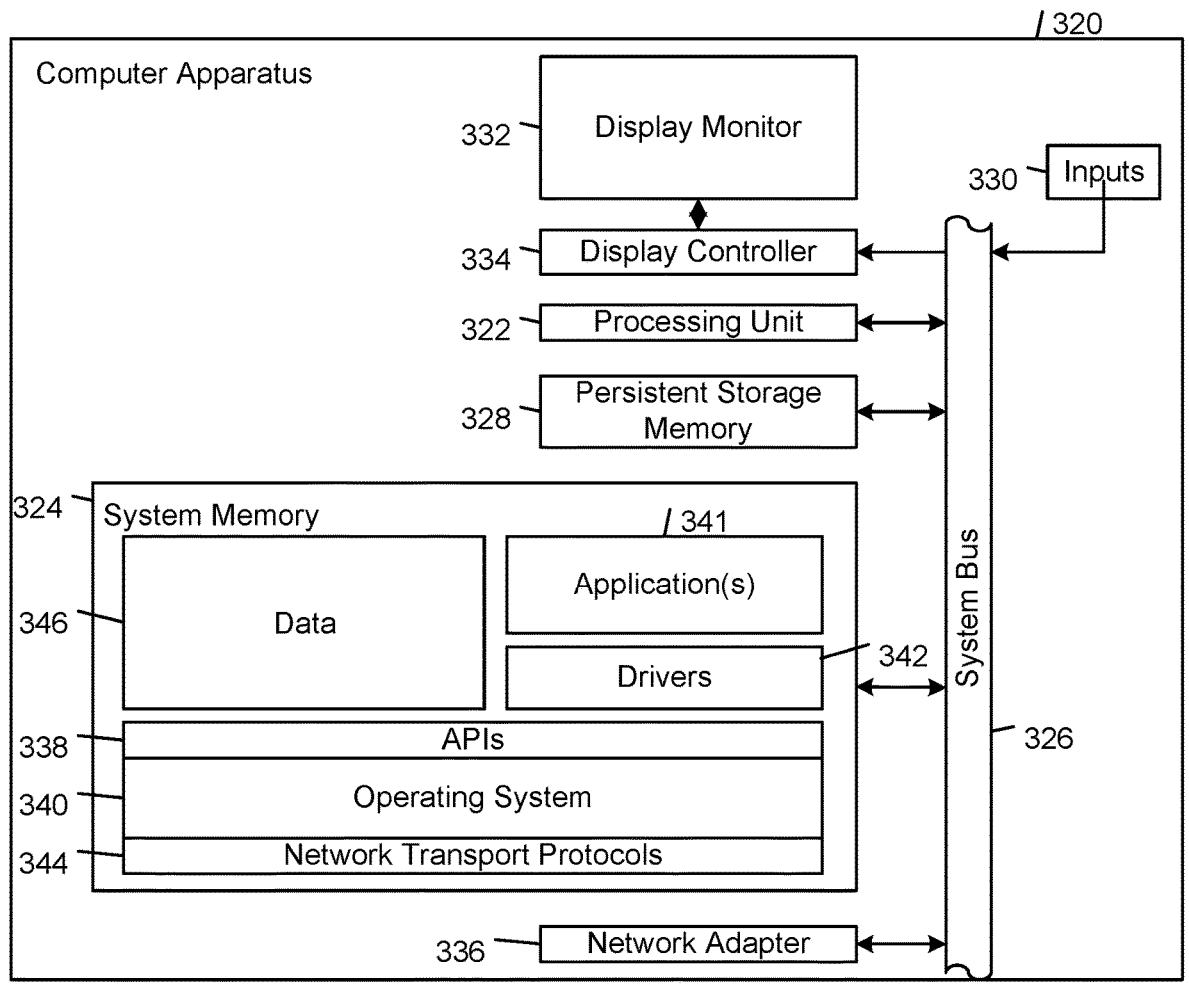
FIG. 17 is a block diagram of an example computer apparatus.

FIG. 16A shows an enlarged top view of a top surface of an adhesive tape platform segment 212 that has been marked with a respective bar code, and FIG. 16B shows a block diagram of an example set of components included within the body of the adhesive tape platform segment 212. In general, an adhesive tape platform segment 212 may include any combination of the wireless communications and transducer components disclosed in connection with the segment examples shown in FIGS. 4 and 7A-7D.

In some examples, the adhesive tape platform segment 212 also includes an initialization circuit 216 for initializing the adhesive tape platform segment 212. In some of these examples, the initialization circuit 216 initializes the adhesive tape platform segment in response to stimulus received from the printer 200.

In some examples, one or more components of the printing system 200 generate a stimulus that turns on the adhesive tape platform segment 212 by connecting the energy storage component(s) 92 to one or more of the wireless circuit(s) 82, 86, transducer(s) 94, processor(s) 90, and the memory 96. In some of these examples, the energy storage component(s) 90 may be connected to one or more of the other components of the adhesive tape platform segment 212 as the adhesive tape platform segment 212 is being loaded into the printing system 200, as the print head 210 is printing markings on the top surface of the adhesive tape platform segment 212, and/or after the adhesive tape platform segment 212 has been printed out.

In some examples, the stimulus includes a change in capacitance or output of a bend sensor as the adhesive tape platform segment 212 passes over or between one or more printer rollers that is detected by a transducer 94, which turns on a switch in the adhesive tape platform segment 212 that connects the energy storage component(s) 92 to one or more of the other components of the adhesive tape platform segment 212.

In some examples, the stimulus includes an electromagnetic wave wakeup signal that is generated by a transmitter or transceiver (e.g., a near field communication transceiver) component of the printer 200 (e.g., a communications unit 216) and is detected by a wakeup circuit in the adhesive tape platform segment 212, which connects the energy storage component(s) 92 to one or more of the other components of the adhesive tape platform segment 212. In some examples, the electromagnetic wave stimulus induces in a receiver component (e.g., a coil antenna) of the adhesive tape platform segment 212 a current that enables data to be read from the memory component 96. In some examples, the electromagnetic wave transmitter or transceiver is located on the print head 210. In some examples, some or all of the data that is printed on the top surface of the adhesive tape platform segment 212 also can be stored in the memory 96 of the adhesive tape platform segment 212.

After one or more electronic components of an adhesive tape platform segment 212 have been activated, the communications unit 216 can communicate with the adhesive tape platform segment 212. For example, the communications unit 216 may read and/or write data to the memory 96. In some examples, the communications unit 216 reads data, such as an identification number (e.g., a universally unique identifier (UUID)) that is stored in the memory 96, and/or stores data, such as an identification number (e.g., a universally unique identifier (UUID)) in the memory 96. In some examples, one or more other devices (e.g., a mobile phone) may have read or write access to data to the memory 96 of an adhesive tape platform segment.

In some examples, one or more components of the printing system 200 generate a stimulus that turns off the adhesive tape platform segment 212 by disconnecting the energy storage component(s) 92 from one or more of the wireless circuit(s) 82, 86, transducer(s) 94, processor(s) 90, and the memory 96. In some examples, the adhesive product includes one or more switches or relays (e.g., general-purpose input/output (GPIO) channel) that enables the adhesive product to be shutdown according to a processor controlled hibernation protocol.

In some examples, before or during printing, the communications unit 216 retrieves data stored in the memory 96 of one or more of the adhesive tape platform segments 212 or other memory component of the adhesive product 207, and sends the retrieved data to be integrated into the print content to the printer controller for printing on the top surfaces of one or more of the adhesive tape platform segments by the print head 210. In some examples, a user's mobile device may write data to a memory component of the adhesive product 207 that directs the printer what to print based on information (e.g., a calendar date or time) that is uploaded from the memory component by the communications unit 216.

In some multi-segment adhesive product sheet examples, the adhesive product sheet has a shared controller across multiple labels that create a hierarchy of computing that is used to configure the printing system 200. In some of these examples, one of the segments of the adhesive product sheet is the master and other segments are the slaves with respect to communications between the adhesive product sheet 207 and the printing system 200.

FIG. 16 shows an example embodiment of computer apparatus 320 that, either alone or in combination with one or more other computing apparatus, is operable to implement one or more of the computer systems described in this specification, including one or more of the tracking service system 54, the network system 52, the client system 58, and the monitoring equipment 56.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A plurality of devices, each device comprising:
   a substrate;
   a top cover; and
   a device layer between the substrate and the top cover, wherein
   each of the plurality of devices is removably attached to at least one other device of the plurality of devices,
   a first device of the plurality of devices comprises a sensor of a first type in the device layer, and
   a second device of the plurality of devices does not include a sensor of the first type in the device layer.

2. The plurality of devices of claim 1, wherein the first device further comprises:
   a processor;
   a memory storing at least a first identifier;
   a battery; and
   a wireless communication system.

3. The plurality of devices of claim 2, wherein the second device does not include a processor, a memory, and a wireless communication system.

4. The plurality of devices of claim 2, the first second device further comprises:
a second processor;
a second memory storing at least a second identifier;
a second battery; and
a second wireless communication system.

5. The plurality of devices of claim 1, wherein the substrate is a flexible substrate, and the cover layer is flexible cover layer.

6. The plurality of devices of claim 1, wherein the first device further comprises an aperture in the top cover of the first device that is aligned with the sensor of the first type.

7. The plurality of devices of claim 1, wherein a third device of the plurality of devices comprises a sensor of the first type.

8. The plurality of devices of claim 7, wherein the plurality of devices are arranged in a strip, and the second device is positioned between the first device and the third device.

9. The plurality of devices of claim 7, wherein the third device of the plurality of devices comprises a sensor of a second type.

10. The plurality of devices of claim 1, wherein the plurality of devices are arranged in sequence to form a continuous strip.

11. The plurality of devices of claim 1, wherein the plurality of devices are arranged in a roll.

12. The plurality of devices of claim 1, wherein the second device does not include any active electronic components.

13. The plurality of devices of claim 1, wherein the plurality of devices are configured to be attached to an asset for tracking the asset.

14. The plurality of devices of claim 1, wherein the plurality of devices are part of continuous segment of an adhesive tape platform.

15. The plurality of devices of claim 1, wherein first device is configured to transition from an off state to an on state, in response to being separated from one or more devices of the plurality of devices.

16. A method comprising:
attaching a plurality of devices to an asset, the plurality of devices comprising a first device and a second device; and
tracking the asset by performing wireless communications with the first device, wherein the first device comprises:
a processor,
a battery,
a memory storing at least a first identifier, and a
wireless communication system of a first type;
wherein first device is configured to transition from an off state to an on state, in response to being separated from one or more devices of the plurality of devices.

17. The method of claim 16, the second device not including a processor, a memory, and a wireless communication system.

18. The method of claim 16, wherein the plurality of devices are part of a continuous segment of an adhesive tape platform.

19. The method of claim 16, wherein the first device comprises a sensor of a first type in a device layer thereof, and the second device does not include a sensor of the first type in a device layer thereof.

20. A non-transitory computer readable medium executable by a processor and comprising:
a first portion that, when executed by the processor, tracks an asset by performing wireless communications with a first device, the first device being one of a plurality of devices attached to an asset, wherein the first device comprises:
a processor,
a battery,
a memory storing at least a first identifier, and a
wireless communication system of a first type;
wherein first device is configured to transition from an off state to an on state, in response to being separated from one or more devices of the plurality of devices.

* * * * *